United States Patent
van der Pol et al.

(10) Patent No.: US 6,397,133 B1
(45) Date of Patent: May 28, 2002

(54) VEHICLE ROLLOVER SAFETY SYSTEM

(75) Inventors: Paul van der Pol; Meredith Leathers, both of Louisville, KY (US)

(73) Assignee: Palmer Safety Systems, LLC, Louisville, KY (US)

( * ) Notice: Subject to any disclaimer, the term of this patent is extended or adjusted under 35 U.S.C. 154(b) by 0 days.

(21) Appl. No.: 09/551,090

(22) Filed: Apr. 18, 2000

Related U.S. Application Data

(60) Provisional application No. 60/129,984, filed on Apr. 19, 1999.

(51) Int. Cl.[7] .................. B60G 23/00; G06F 17/00; B60K 28/12; B60Q 1/00
(52) U.S. Cl. .................. 701/37; 701/36; 701/38; 701/39; 180/282; 340/440; 340/438; 342/357.07
(58) Field of Search .................. 701/36, 37, 29, 701/38, 39, 43; 340/440, 438, 439, 459; 342/457, 357.07, 357.12; 180/282

(56) References Cited

U.S. PATENT DOCUMENTS

| | | | |
|---|---|---|---|
| 674,970 A | 5/1901 | Kennedy | 434/397 |
| 711,510 A | 10/1902 | Little | 40/406 |
| 1,415,344 A | 5/1922 | Haskell | 446/343 |
| 1,423,383 A | 7/1922 | Zaiden | 446/353 |
| 1,674,943 A | 6/1928 | Berger | 446/353 |
| 1,685,358 A | 9/1928 | Harcourt | 40/416 |
| 2,637,936 A | 5/1953 | Daleet et al. | 46/120 |
| 2,691,845 A | 10/1954 | Jepson | 46/120 |
| 3,564,496 A | 2/1971 | Brooks et al. | |
| 3,613,299 A | 10/1971 | Amiciet et al. | 46/120 |
| 3,643,374 A | 2/1972 | Gunther et al. | 46/139 |
| 3,644,883 A | 2/1972 | Borman et al. | |
| 3,646,583 A | 2/1972 | Scuderi | |
| 3,660,931 A | 5/1972 | Gardel et al. | 46/120 |
| 3,671,933 A | 6/1972 | Barnes | |
| 3,798,594 A | 3/1974 | Funk | |
| 3,818,161 A | 6/1974 | Richey | |
| 3,888,023 A | 6/1975 | Genin | 35/29 |
| 3,914,692 A | 10/1975 | Seaborn, Jr. | |
| 3,986,119 A | 10/1976 | Hemmer, Jr. et al. | |
| 4,009,375 A | 2/1977 | White et al. | |
| 4,016,535 A | 4/1977 | Dinlocker | |
| 4,040,206 A | 8/1977 | Kimura | 46/138 |
| 4,078,224 A | 3/1978 | Mize | |
| 4,107,689 A | 8/1978 | Jellinek | |
| 4,278,854 A | 7/1981 | Krause | |
| 4,284,987 A | 8/1981 | Gibson et al. | |
| 4,349,809 A | 9/1982 | Tomes | |
| 4,359,733 A | 11/1982 | O'Neill | |
| 4,369,426 A | 1/1983 | Merkel | |
| 4,386,674 A | 6/1983 | Sugata | |
| 4,545,775 A | 10/1985 | Kim | 446/299 |

(List continued on next page.)

FOREIGN PATENT DOCUMENTS

GB  2221401  7/1990  .......... A63H/13/00

Primary Examiner—Jacques H. Louis-Jacques
Assistant Examiner—Brian J Broadhead
(74) Attorney, Agent, or Firm—Stites & Harbison, PLLC; David W. Nagle, Jr.; Vance A. Smith

(57) ABSTRACT

A sensing and notification system helps prevent vehicle rollover accidents, and/or, in the event of such an accident, notifies emergency rescue and/or medical personnel of the same. Vehicle sensors and an associated microprocessor and central controller cooperate to determine whether a potential or immediate rollover condition exists, and then appropriately communicate the existence of such condition to the vehicle operator or other vehicle occupants through local alarms and/or a remote call center through radio transmission of emergency signals. Should a potential rollover condition exists, the system provides local notification to the vehicle operator or occupants through an audible alarm and/or a visible alarm, and further provides a recommended steering correction. Should an immediate rollover condition exists, the system activates the audible and/or visible alarms, while simultaneously transmitting an emergency signal via a radio communications transceiver to a call center so that necessary emergency assistance can be dispatched.

17 Claims, 13 Drawing Sheets

U.S. PATENT DOCUMENTS

| | | | |
|---|---|---|---|
| 4,658,508 A | 4/1987 | Oberg | |
| 4,676,764 A | 6/1987 | Yeu | 446/298 |
| 4,682,145 A | 7/1987 | Brawner, Jr. | |
| 4,701,760 A | 10/1987 | Raoux | |
| 4,715,468 A | 12/1987 | Baumann et al. | |
| 4,784,237 A | 11/1988 | Condne et al. | |
| 4,801,285 A | 1/1989 | Yeu | 446/298 |
| 4,828,530 A | 5/1989 | Lee | 446/354 |
| 4,836,819 A | 6/1989 | Oishi et al. | 446/288 |
| 4,846,752 A | 7/1989 | Combs | 446/279 |
| 4,853,675 A | 8/1989 | Foster | |
| 4,867,730 A | 9/1989 | Lee | 446/353 |
| 4,869,703 A | 9/1989 | Ong | 446/353 |
| 4,878,878 A | 11/1989 | Bittner | 446/139 |
| 4,897,642 A | 1/1990 | DiLullo et al. | |
| 4,901,459 A | 2/1990 | Lee | 40/414 |
| 4,944,708 A | 7/1990 | Kawabe | 446/175 |
| 4,949,991 A | 8/1990 | Ludwig | |
| 4,952,908 A | 8/1990 | Sanner | |
| 4,988,974 A | 1/1991 | Fury et al. | |
| 5,119,102 A | 6/1992 | Barnard | |
| 5,147,238 A | 9/1992 | Kelleyet et al. | 446/330 |
| 5,176,560 A | 1/1993 | Wetherell et al. | 466/175 |
| 5,223,844 A | 6/1993 | Mansell et al. | |
| 5,224,896 A | 7/1993 | Terzian | 446/355 |
| 5,311,197 A | 5/1994 | Sorden et al. | |
| 5,504,482 A * | 4/1996 | Scheder | 340/995 |
| 5,508,920 A | 4/1996 | Gioutsos et al. | |
| 5,515,043 A | 5/1996 | Berard et al. | |
| 5,517,199 A | 5/1996 | DiMattei | |
| 5,532,672 A | 7/1996 | Plazarin | |
| 5,572,204 A | 11/1996 | Timm et al. | |
| 5,609,340 A | 3/1997 | Chuang | 273/448 |
| 5,610,575 A | 3/1997 | Gioutsos | |
| 5,650,770 A | 7/1997 | Schlager et al. | |
| 5,684,456 A | 11/1997 | Walter | |
| 5,726,663 A | 3/1998 | Moyer et al. | |
| 5,735,726 A | 4/1998 | Cohen | 446/298 |
| 5,754,136 A | 5/1998 | Kojima et al. | |
| 5,781,101 A | 7/1998 | Stephen et al. | |
| RE35,920 E | 10/1998 | Sorden et al. | |
| 5,825,284 A | 10/1998 | Dunwoody et al. | |
| 5,841,345 A | 11/1998 | Kestenberg | |
| 5,852,401 A | 12/1998 | Kita | |
| 5,890,084 A | 3/1999 | Halasz et al. | |
| 5,911,617 A | 6/1999 | Chou | 446/353 |
| 5,933,080 A | 8/1999 | Nojima | |
| 5,969,598 A | 10/1999 | Kimura | |
| 6,001,510 A | 12/1999 | Meng et al. | |
| 6,002,974 A | 12/1999 | Schiffmann | |
| 6,002,975 A | 12/1999 | Schiffmann et al. | |
| 6,023,220 A * | 2/2000 | Dobler et al. | 340/440 |
| 6,028,514 A | 2/2000 | Lemelson et al. | |
| 6,028,537 A | 2/2000 | Suman et al. | |
| 6,032,094 A | 2/2000 | Uanagi et al. | |
| 6,038,495 A * | 3/2000 | Schiffermann | 701/1 |

\* cited by examiner

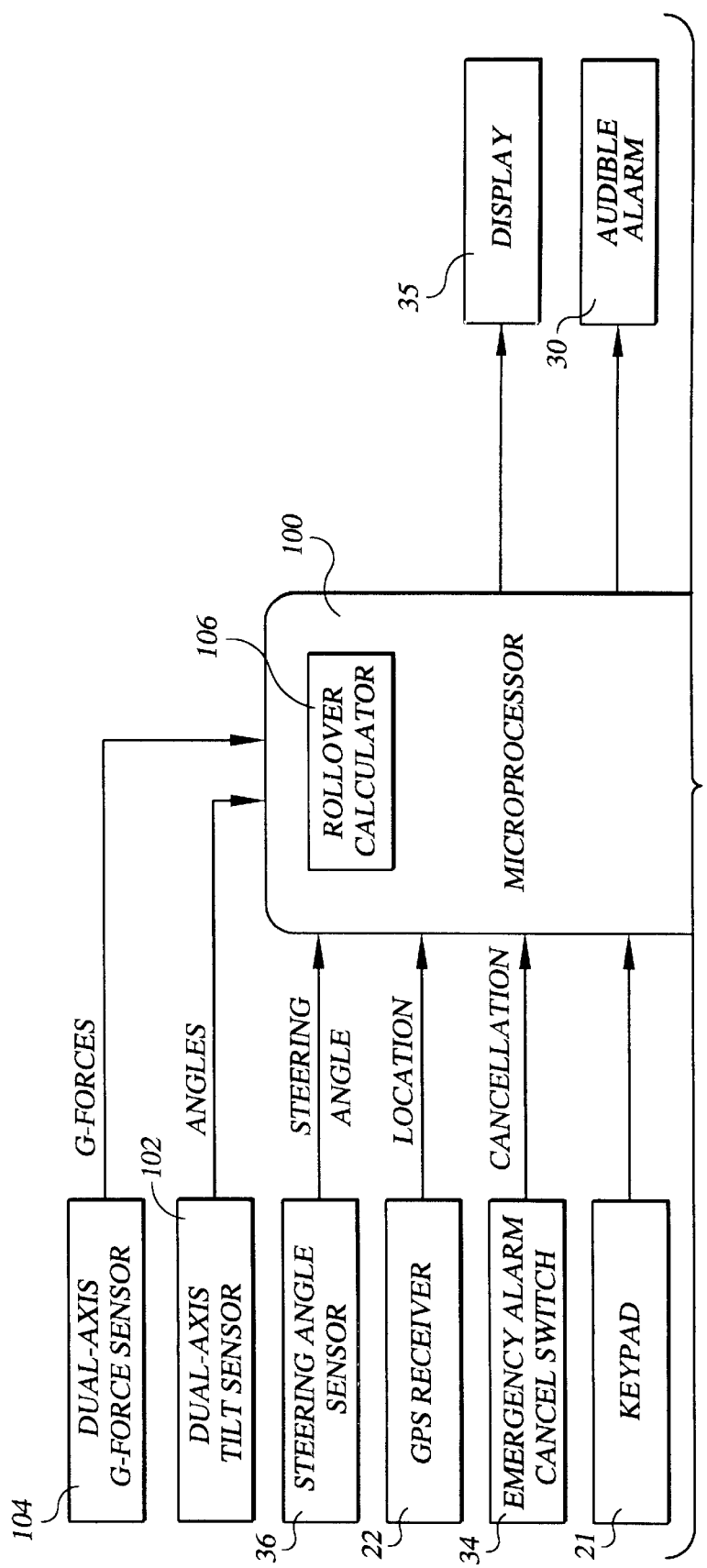

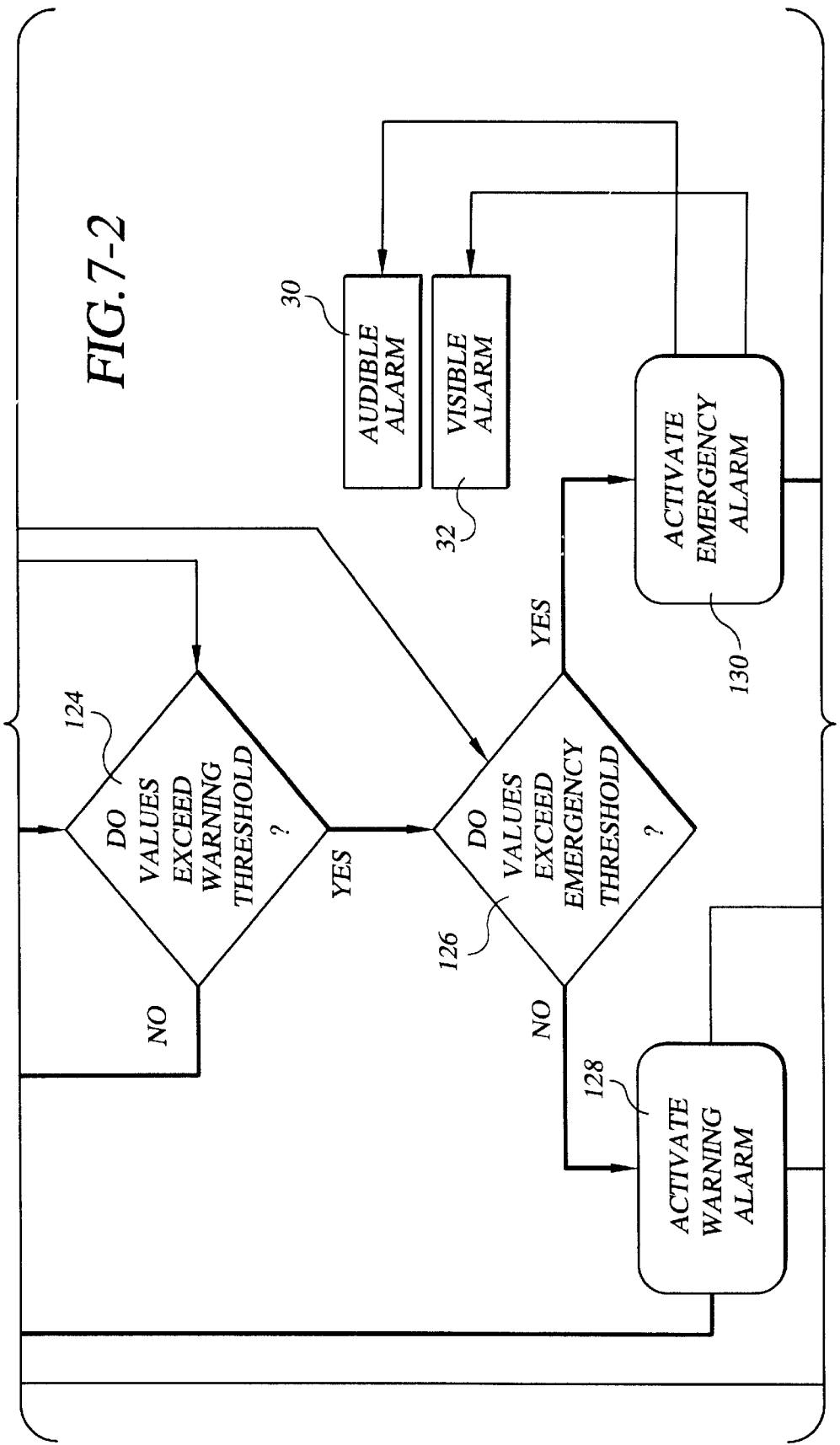

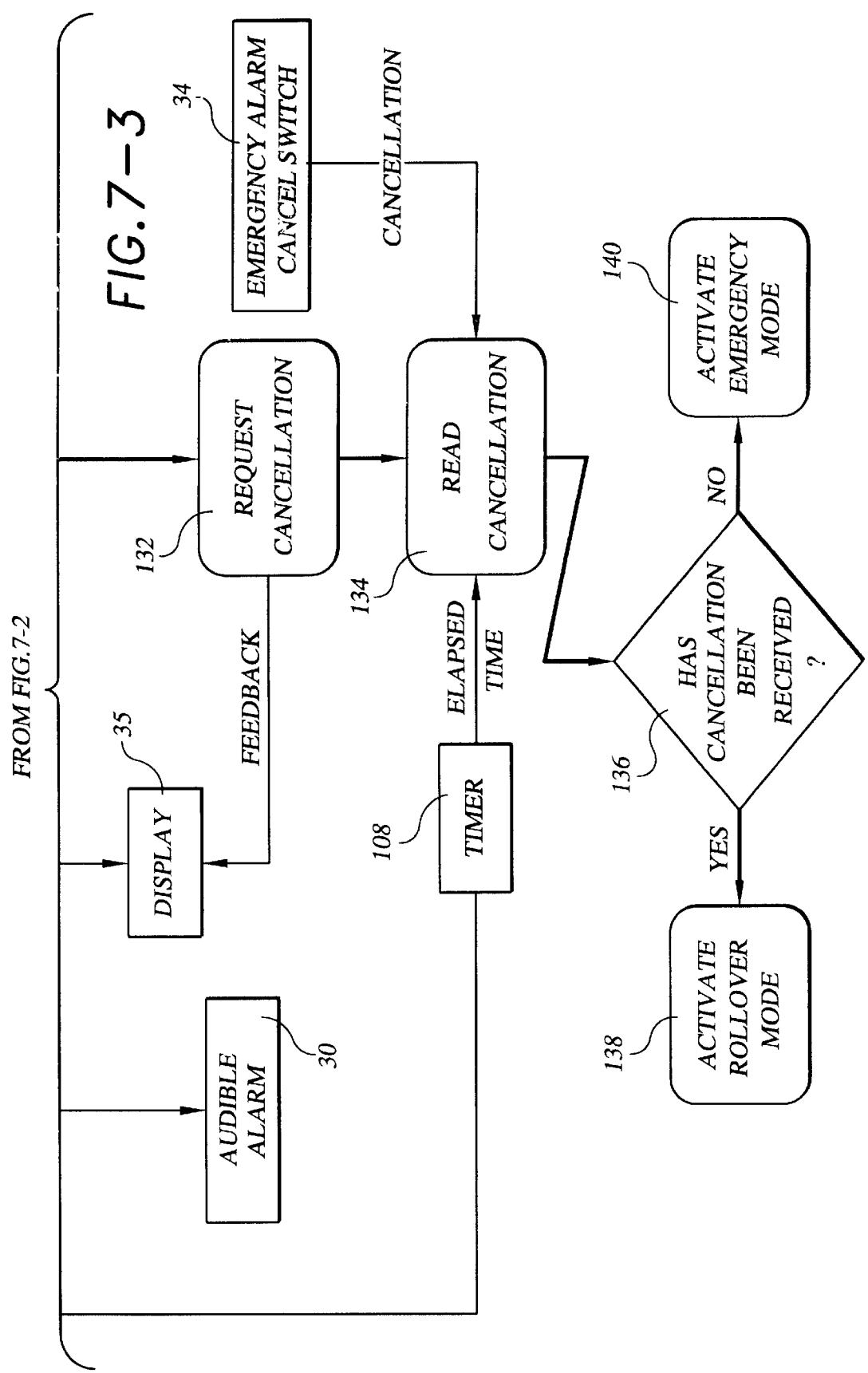

ROLLOVER MODE

SETUP MODE

TEST MODE
(LOCAL ACTIVATION)

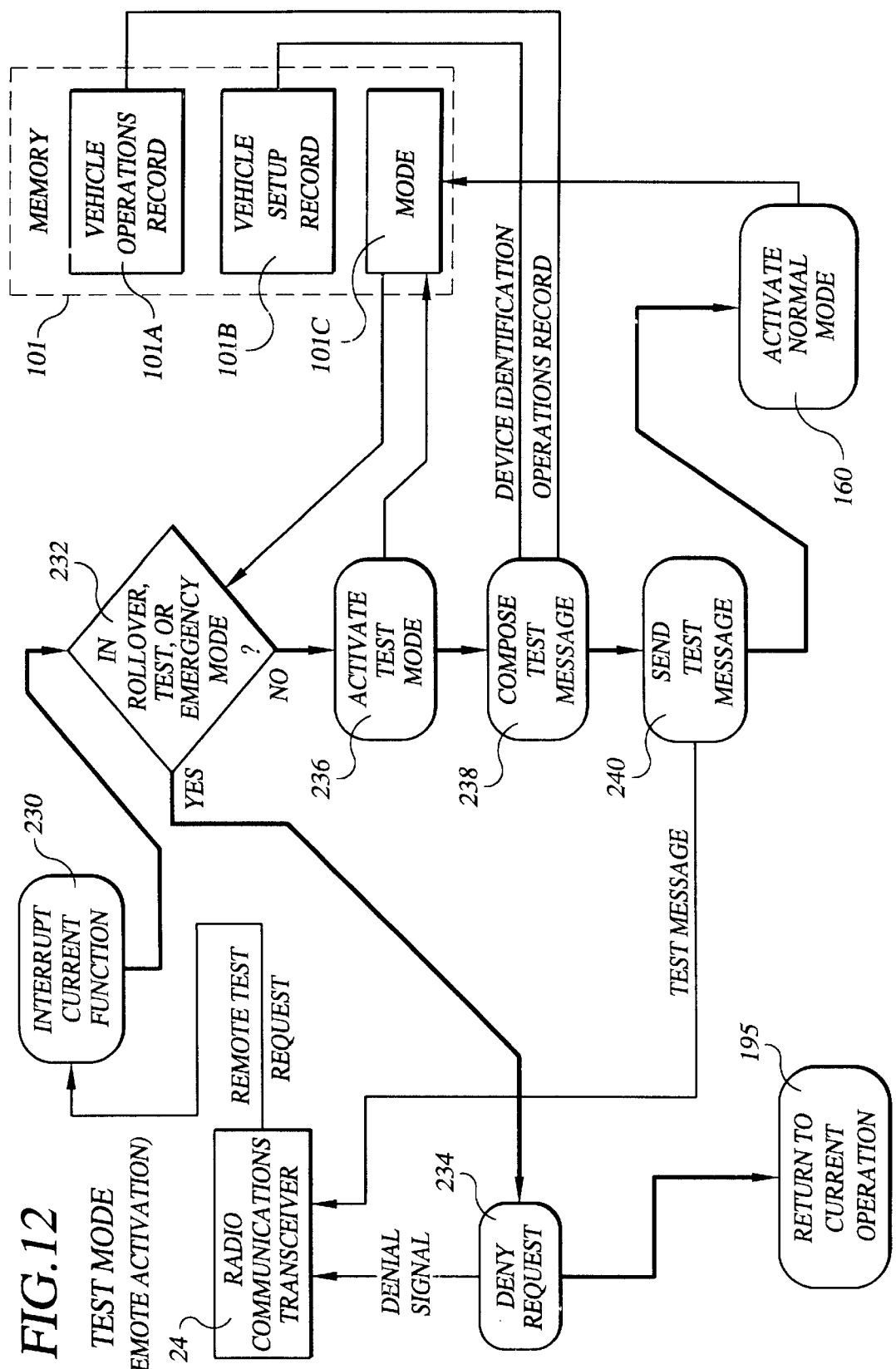

VEHICLE ROLLOVER SAFETY SYSTEM

CROSS-REFERENCES TO RELATED APPLICATIONS

This application claims priority from U.S. provisional application No. 60/129,984 filed Apr. 19, 1999.

BACKGROUND OF THE INVENTION

The present invention relates to a safety system for vehicles, particularly a sensing and notification system that helps prevent vehicle rollover accidents, or, in the event of such an accident, notifies emergency rescue and/or medical personnel of the same.

Various emergency notification systems have been developed to activate safety systems or to notify third parties when a vehicle accident or similar abnormal condition has occurred. Of particular note, U.S. Pat. No. Re. 35,920, issued to Sorden et al. and assigned to Trimble Navigation Limited of Sunnyvale, Calif., describes in detail prior art related to such emergency safety and notification systems. U.S. Pat. No. Re. 35,920 is incorporated herein by reference.

As discussed in U.S. Pat. No. Re. 35,920, when a vehicle encounters an abnormal situation, such as a collision, emergency systems are often designed to activate a safety device (e.g., air bag) to minimize injury or damage to the vehicle occupants. This activation is often achieved through the use of an unspecified vehicle sensor that senses and responds quickly to the occurrence of any one of a predetermined group of abnormal vehicle conditions by generating a signal that activates the safety device. If this abnormal condition incapacitates a vehicle occupant, it might also be necessary to transmit an emergency or distress signal to notify a third party of the abnormal condition without requiring a conscious decision or volitional act by a vehicle occupant.

There are various prior art teachings related to the transmission of such an emergency signal when a collision or other abnormal condition occurs. For example, U.S. Pat. No. 3,441,858, issued to Graham, describes an electronic calling and reply system that may be activated, either automatically or manually, to broadcast one of a selected group of distress signals upon the occurrence of a vehicle accident. In the preferred system, the vehicle carries one transceiver unit which transmits a selected distress signal. This signal preferably indicates whether: (1) a tow truck is needed; (2) an ambulance is needed; or (3) both a tow truck and an ambulance are needed. A central aid station receives this distress signal and responds to receipt of that distress signal by broadcasting a response signal indicating that assistance is being sent to the vehicle.

U.S. Pat. No. 3,461,423, issued to Trumble, describes a vehicle distress tone generator that automatically broadcasts a selected tone in response to occurrence of a vehicle accident, the appropriate tone being selected based on the severity of the accident. The broadcast of the distress tone can also be initiated by a vehicle occupant.

Similarly, U.S. Pat. No. 3,646,583, issued to Scuderi, discloses an automatic vehicle accident signaling apparatus that includes a sensor for measuring the severity of an accident. Upon the occurrence of an accident, a distress signal indicating the severity of the accident is transmitted to a remote assistance station.

U.S. Pat. No. 3,990,040, issued to Gleitz et al. and assigned to Thomson-CSF of Paris, France, describes an apparatus for transmitting distress signals. The distress signal generator is secured to a vehicle and includes a transmitter with a self-locking relay for energizing a high-frequency oscillator from a local battery in response to one or more trigger signals from respective detectors, specifically an impact detector and a deformation detector. The preferred apparatus broadcasts a first distress signal if vehicle impact is sensed and broadcasts a second distress signal if vehicle deformation is sensed.

U.S. Pat. No. 4,091,369, issued to Edelbock, describes a collision-responsive alarm with a rotating reflector and warning light that is secured to the top of a vehicle. Should the vehicle collide with another object, a light source, rotating reflector and warning light is activated, thereby notifying nearby persons that there has been an accident.

Although each of the above-mentioned patents discusses transmission of an emergency signal, aside from U.S. Pat. No. Re. 35,920, there is no teaching in the above-referenced patents related to an accurate determination of the location of the vehicle or accident, nor do any of these patents describe local notification that may indeed aid in preventing the accident.

U.S. Pat. No. 3,828,306, issued to Angeloni, describes a highway distress signal broadcast system. In this system, the location of the vehicle is determined through triangulation by three or more nearby radio direction finding devices (RDFs). The vehicle broadcasts a distress signal and is received by the nearby RDFs. Each RDF receives the vehicle distress signal and identifies the direction from which the signal is being broadcast. A central processing station receives this directional information from the RDFs, determines the location of the vehicle in distress through simple triangulation techniques, and dispatches assistance for the vehicle.

U.S. Pat. No. 4,216,545, issued to Flickshu et al. and assigned to Blaupunkt Werke GmbH of Hildesheim, Germany, describes a method and apparatus for communicating emergency signals using Citizens Band (CB) radio channels. When an accident occurs, a transceiver associated with the vehicle is activated, either manually or automatically, and broadcasts a distress signal in each of a sequence of CB radio bands. By so broadcasting the vehicle distress signal in each CB channel, it is contemplated that some CB users will hear and respond to the distress signal. The transceiver is then set to a preselected channel, perhaps Channel 9, the CB emergency channel, to receive inquiries or other information from CB radio users who heard the distress signal. Provided that he is able to do so, a vehicle occupant can then communicate to responding CB users the location of the vehicle.

U.S. Pat. No. 4,369,426, issued to Merkel and assigned to REPA Feinstanzwerk GmbH of Alfdorf, Germany, describes another emergency distress signal system for motor vehicles wherein the distress signal also indicates the vehicle location. Distress signal transmission is activated by sensors that respond to a vehicle collision or similar event. These sensors preferably have different activation thresholds that correspond to the severity of the collision and may thereby cause transmission of different and distinct distress signals. Similar to U.S. Pat. No. 3,828,306 (as described above), vehicle location is determined through triangulation. Three or more receiving stations receive the distress signal and identify the direction from which the signal is being broadcast. A central processing station receives this directional information and can thus pinpoint the location of the vehicle. Merkel additionally notes that information received by the central station may also indicate the severity of the collision and whether certain safety equipment was operable when the collision occurred.

U.S. Pat. No. 4,717,904, issued to Murakami and assigned to Aisin Seiki Kabushiki Kaisha of Aichi, Japan, describes a collision responsive signal emitter for a vehicle. The preferred device includes a first detecting means which produces a signal representing an acceleration in both the fore-and-aft direction and the lateral direction of a vehicle, a second detecting means which produces a signal representing the inclination of the vehicle, and a third detecting means which produces a signal indicating the presence or absence of water within the vehicle. A signal transmitting means and a control for energizing the signal transmitting means are also provided to produce an emergency signal whenever at least one of the aforementioned detecting means produces an abnormality signal. Furthermore, to account for possible damage to a particular signal transmitting means (e.g., an antennae), it is preferred that a plurality of signal generating means be located at different locations on the vehicle.

U.S. Pat. No. 4,740,792, issued to Sagey et al. and assigned to Hughes Aircraft Company of Los Angeles, Calif., describes a vehicle location system activated by vehicle motion, vehicle collisions, and vehicle intrusion/theft. Each vehicle in the system has a transmitter attached thereto that generate a unique transmission signal signature. When activated, the transmitter broadcasts a signal indicative of the condition of the vehicle which is received and relayed by each of three or more satellites or signal relay towers to a central data processing station. Through triangulation, the location of the vehicle can be determined. This system is designed for monitoring a large number of vehicles simultaneously.

The aforementioned U.S. Pat. No. Re. 35,920, issued to Sorden et al. and assigned to Trimble Navigation Limited of Sunnyvale Calif., improves upon prior art teachings for broadcasting an emergency signal indicating that a vehicle is in distress by using a ground-based radionavigation system (e.g., LORAN, Shoran, Decca or TACAN) or by a satellite-based radionavigation system (e.g., Global Positioning System or Global Orbiting Navigational System) for determining the location of the vehicle in distress. In this patent, such radionavigation systems are generically referred to as distance measuring systems (DMS).

As described in U.S. Pat. No. Re. 35,920, where satellite-based signals are used, the radionavigation system includes an antenna and associated receiver/processor mounted on a vehicle. This receiver antenna and associated receiver/processor receive different coded signals from each of two or more satellites which are in non-geosynchronous orbits around the Earth. The system continuously or intermittently determines the present location of the antenna based upon the relative and absolute times each coded signal is received and any frequency shifts that occur for each such signal.

Where ground-based signals are used, the radionavigation system again includes an antenna and associated receiver/processor mounted on a vehicle. However, in this system, the antenna and receiver/processor receive two or more timed signals from fixed, ground-based transmitters. The location of the vehicle relative to the known positions of the transmitters is determined based on the timing differences or other signal characteristics.

Although the vehicle location can be determined at any time, the location of the vehicle is only broadcast in response to the imminent or present occurrence of an abnormal vehicle event or condition, as determined by one or more unspecified vehicle operating sensors attached to the vehicle, or in response to a volitional act by a vehicle occupant. Along with this location information, the system also preferably broadcasts previously-sensed and temporarily-stored information on vehicle operating parameters.

In this regard, this system and the other various distress signaling systems described above focus on responding to passenger vehicle accidents on pubic roads, rather than responding to accidents that occur in rural or remote areas (e.g., private farms). In such remote areas, the presence and/or arrival of other vehicles to render assistance or contact emergency personnel cannot be expected or relied upon. And, in such remote areas, many ground-based communications are not practicable because of the dearth of required communication relay stations.

Finally, although the system described in U.S. Pat. No. Re. 35,920 has general relevance to abnormal vehicle conditions, it fails to teach or describe the broadcast of an emergency or warning signal in response to indication by vehicle sensors of an imminent or present rollover of a vehicle. It also fails to provide a local notification system that may aid in preventing the accident.

Rollover accidents pose a serious threat to a vehicle occupant. In the passenger automobile industry, various air bags systems and similar safety restraint systems have been developed to protect vehicle occupants in a rollover accident. Such safety systems do require a measurement and prediction of vehicle rollover. For example, U.S. Pat. No. 6,038,495, issued to Schiffmann and assigned to the Delco Electronics Corporation of Kokomo, Ind., describes one apparatus and method for predicting rollover. However, since this system is designed to cause the deployment of air bags, which occurs only in response to an immediate rollover, there is no teaching related to operator notification. In other words, the operator receives no advance warning of the rollover condition so that appropriate corrective action can be taken. Schiffmann, though, does provide teaching as to the design and structure of one type of rollover sensor that may be incorporated into the present invention, and thus U.S. Pat. No. 6,038,495 is incorporated herein by reference.

In relation to farm tractors, mobile construction equipment, logging equipment, forklift trucks, and similar vehicles, rollover accidents occur with great regularity, as these vehicles often travel over uneven, unstable, or slippery terrain. And, the severity of a rollover accident is often compounded by the fact that farm tractors and similar vehicles are often operated by a single operator in rural or remote locations where emergency medical assistance may not be readily available or the accident may go undetected for hours. Indeed, in a 1993 publication entitled "A Guide to Tractor Roll Bars and Other Rollover Protective Structures," the Wisconsin Rural Health Research Center estimated that between 300 and 400 people die from farm tractor rollovers each year.

To address the frequency and severity of rollover accidents, especially farm tractor rollovers, equipment designers and manufacturers have primarily focused on protecting the tractor operator. In this regard, many farm tractors and similar vehicles are provided with a rollover protective structure (ROPS), such as a roll bar. Although a ROPS may be prevent more serious injury, such a structure still does not prevent the occurrence of a rollover nor does it provide a means to obtain assistance for an injured vehicle operator or occupant.

It is therefore a paramount object of the present invention to provide a safety system for vehicles that helps prevent vehicle rollover accidents, or, in the event of such an accident, notifies emergency rescue and/or medical personnel of the same.

It is a further object of the present invention to provide a safety system that measures that angular orientation and accelerations resulting from movement of the vehicle to determine whether a potential or immediate rollover condition exists.

It is still a further object of the present invention to provide a safety system that continuously temporarily stores records the movements of the vehicle, changes in vehicle operating mode, and the status of the safety system. These and other objects and advantages of the present invention will become apparent upon a reading of the following description.

SUMMARY OF THE INVENTION

The present invention is a safety system, particularly a sensing and notification system that helps prevent vehicle rollover accidents, and/or, in the event of such an accident, notifies emergency rescue and/or medical personnel of the same. The primary components of the overall system include a vehicle to which the local sensing and notification components of the present invention are secured, a plurality of global positioning satellites for communicating with the vehicle to identify the location of the vehicle, a remote radio communications transceiver for receiving signals from said vehicle related to an immediate rollover condition, and a call center for receiving such signals from the remote radio communications transceiver and dispatching necessary emergency assistance.

The components of the local sensing and notification subsystem cooperate to determine whether a potential or immediate rollover condition exists, and then appropriately communicate the existence of such condition to the vehicle operator and/or other vehicle occupants through local alarms and/or the call center through radio transmission of emergency signals. Specifically, a rollover calculator associated with a microprocessor and central controller receives data from multiple vehicle sensors and then processes this information to determine the present condition of the vehicle, specifically whether a potential or immediate rollover condition exists.

Should a potential rollover condition exists, the system provides local notification to the vehicle operator or occupants through an audible alarm and/or a visible alarm, and further provides a recommended steering correction.

Should an immediate rollover condition exists, the system activates the audible and/or visible alarms, while simultaneously transmitting an emergency signal via a radio communications transceiver to a call center so that necessary emergency assistance can be dispatched.

BRIEF DESCRIPTION OF THE DRAWINGS

FIG. 12 is a flow diagram depicting the function of the vehicle rollover safety system of the present invention in the test mode initiated by a remote activation.

DESCRIPTION OF THE PREFERRED EMBODIMENTS

The present invention relates to a safety system for vehicles, particularly a sensing and notification system that helps prevent vehicle rollover accidents, or, in the event of such an accident, notifies emergency rescue and/or medical personnel of the same. In this regard, for purposes of this description, when there is a "potential" rollover condition, a rollover accident may be averted through appropriate corrective actions by the vehicle operator, and the present invention seeks to appropriately warn the vehicle operator that such corrective action is necessary. When there is an "immediate" rollover condition, the rollover accident has occurred, and the present invention seeks to apprise a third party of the emergency condition.

Figure 1:
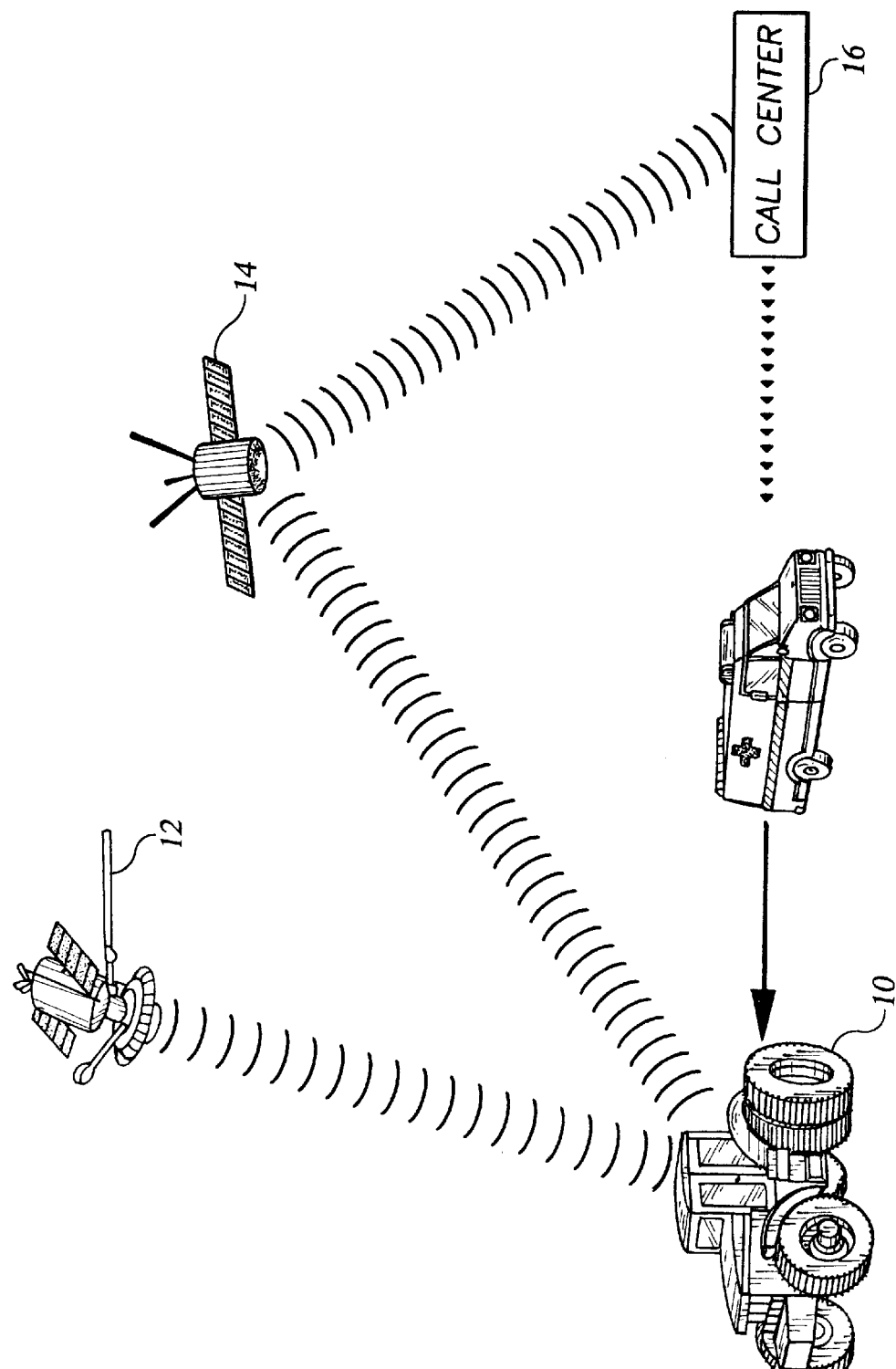
FIG. 1 is a schematic view of the major components of the vehicle rollover safety system of the present invention.

Referring first to FIG. 1, the primary components of the overall system include a vehicle 10 to which the local sensing and notification components of the present invention are secured (as described in further detail below), a plurality of global positioning satellites 12 for communicating with the vehicle 10 to identify the location of the vehicle 10, a remote radio communications transceiver 14 for relaying signals from said vehicle 10 related to an immediate rollover condition, and a call center 16 for receiving such signals from the remote radio communications transceiver 14 and dispatching necessary emergency assistance. The function and use of these components of the present invention will be more clearly understood following a review of the below description.

Figure 2:
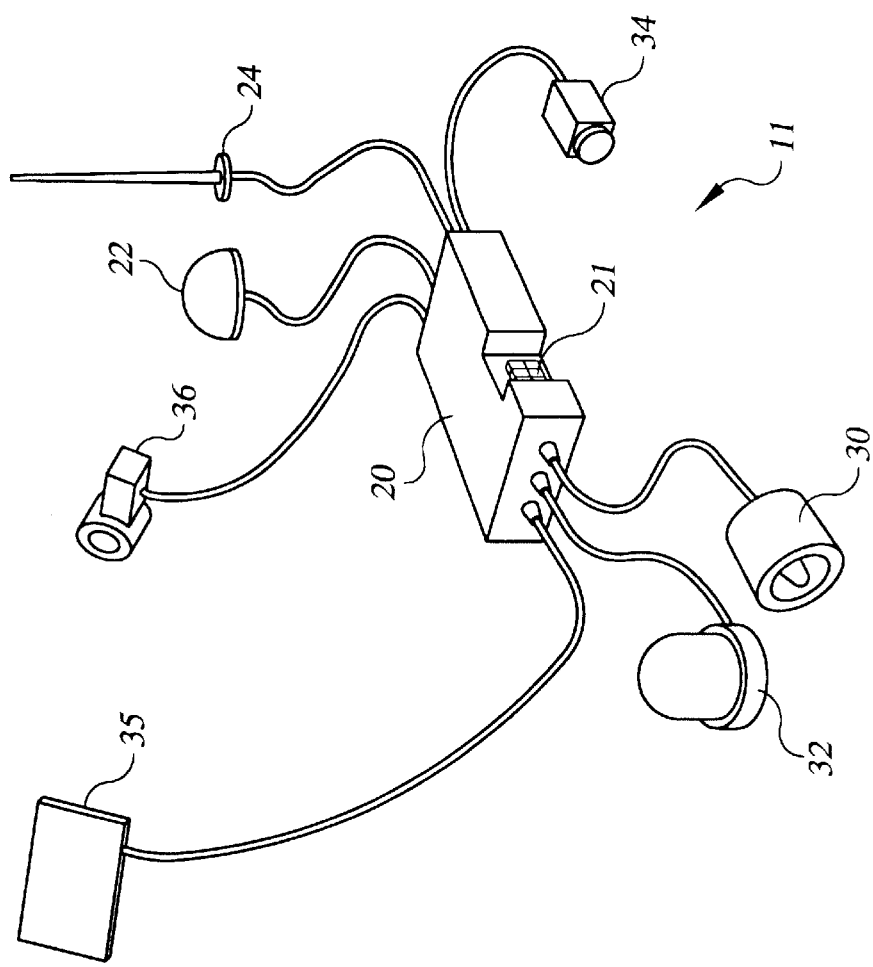
FIG. 2 shows the primary components of the local sensing and notification subsystem of the vehicle rollover safety system of the present invention.

Referring now to FIG. 2, there are preferably multiple components that comprise the local sensing and notification subsystem 11 of the present invention. These components cooperate to determine whether a potential or immediate rollover condition exists, and then appropriately communicate the existence of such condition to the vehicle operator, vehicle occupants, and/or a third party. As shown in FIG. 2, the local sensing and notification subsystem 11 includes a central controller 20 which includes a microprocessor and associated memory register for managing all control and operation of the system, as will be described in detail with reference to the flow diagrams of FIGS. 3 and 7–12. This central controller 20 also includes a keypad 21 or similar input means for entering pertinent information and interfacing with the microprocessor. Furthermore, integral and internal to this central controller 20 are three essential subcomponents: a dual-axis tilt sensor, which measures rotation about the lateral and longitudinal axes of the vehicle; a dual-axis accelerometer (g-force sensor), which measures accelerations acting parallel to the underlying ground surface in the lateral and longitudinal directions; and a rollover calculator. As will be described in further detail below, the rollover calculator receives data from the dual-axis tilt sensor and the dual-axis accelerometer. The rollover calculator then processes this information to determine the present condition of the vehicle, specifically whether a potential or immediate rollover condition exists. Finally, the central controller 20 preferably includes an internal timer for time-stamping records associated with the local sensing and notification subsystem of the present invention, and for measuring elapsed time for requisite operator responses in an emergency condition.

Aside from the central controller 20, the local sensing and notification subsystem 11 depicted in FIG. 2 also includes a GPS receiver 22 for receiving signals from global positioning satellites 12 (as shown in FIG. 1) to identify the location of the vehicle 10, and a local radio communications transceiver 24 for transmitting signals related to an immediate rollover condition to the remote radio communications transceiver 14 (as shown in FIG. 1). To provide local notification to the vehicle operator or occupants, in this preferred embodiment, the local sensing and notification subsystem 11 further includes an audible alarm 30 (e.g., a siren) and a visible alarm 32 (e.g., a strobe light), one or both of which is activated by the microprocessor of the central controller 20 when a potential or immediate rollover condition exists. In conjunction with these alarms 30, 32, it is preferred that there also be an emergency cancel switch 34 that allows a vehicle operator or occupant to cancel the alarms 32, 34 and/or the transmission of signals related to an immediate rollover condition. Finally, in this preferred embodiment, the local sensing and notification subsystem includes a display panel 35 which may be used to provide the operator or vehicle occupants with information about the present operating conditions of the vehicle and the potential for rollover, and also includes a steering angle sensor 36 for periodically measuring the angular orientation of the steered wheels of the vehicle, the importance of which will be further discussed below.

Figure 4:
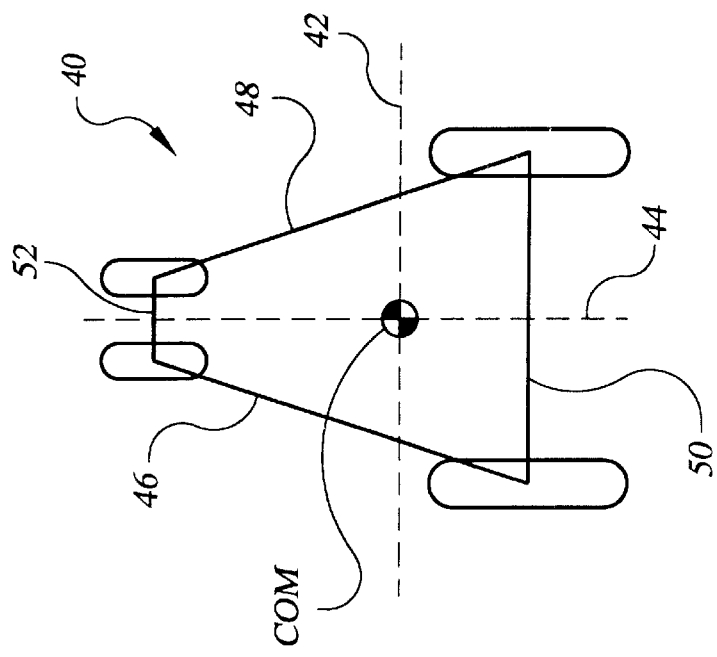
FIG. 4 is a schematic view of the wheels of a vehicle with differing track at the front and rear axle, such as a tractor, onto which the local sensing and notification subsystem is installed, said schematic view showing the rollover edges of the vehicle.

FIG. 4 is a schematic representation of the wheels of a tractor 40 onto which the local sensing and notification subsystem 11 (as shown in FIG. 2) is installed. As indicated in FIG. 4, this vehicle 40 has a predetermined center of mass COM and lateral and longitudinal axes 42, 44. The vehicle 40 also has four rollover edges 46, 48, 50, 52. These rollover edges 46, 48, 50, 52 are defined by the imaginary lines defined by the points of contact of the wheels of the vehicle 40 with the underlying ground surface.

Referring first to the lateral rollover edges 46, 48, a simple rollover occurs when the gravitational force acting on the center of mass COM of the vehicle 40 acts outside of one of the lateral rollover edges 46, 48, such as when the vehicle 40 is moving across an inclined surface. However, in certain circumstances, such as when the vehicle 40 is moving through a turn, the vehicle 40 may be more susceptible to a rollover as there is an additional force (i.e., g-force acting parallel to the underlying ground surface) generated by the lateral acceleration of the vehicle 40 that acts upon the center of mass COM of the vehicle 40. The present invention recognizes the effect of such additional forces upon the vehicle 40 and accounts for such forces in determining whether a potential or immediate rollover condition exists.

Similarly, with respect to the longitudinal rollover edges 50, 52, a simple rollover occurs when the gravitational force acting on the center of mass COM of the vehicle 40 acts outside of one of the longitudinal rollover edges 50, 52, such as when the vehicle 40 is moving uphill or downhill. In this regard, a longitudinal "rollover" is commonly referred to as a "pitchover." For purposes of this description, however, the generic term "rollover" is used to refer to the overturning of the vehicle 40 over its lateral or longitudinal rollover edges. As described with reference to the lateral rollover edges, in certain circumstances, such as when the vehicle 40 abruptly accelerates or decelerates, the vehicle 40 may be more susceptible to a rollover as there is an additional force (g-force acting parallel to the underlying ground surface) generated by the acceleration of the vehicle 40 that acts upon the center of mass COM of the vehicle 40. Again, the present invention recognizes the effect of such forces upon the vehicle 40 and accounts for such forces in determining whether a potential or immediate rollover condition exists, as will be further discussed below.

Figure 5:
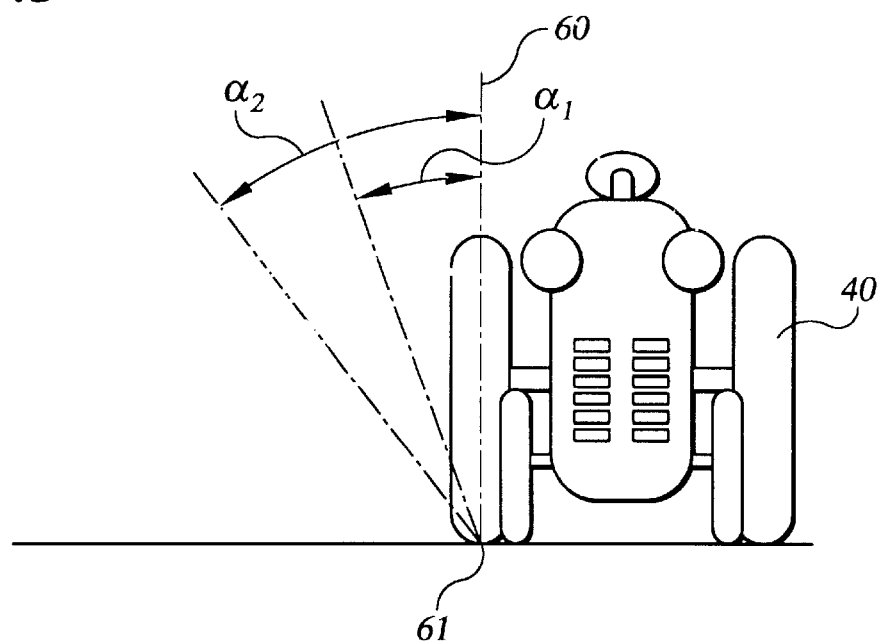
FIG. 5 is a front view of the vehicle depicted in the schematic of FIG. 4.

FIG. 5 is a front view of the tractor 40 depicted in the schematic of FIG. 4 on level ground. This zero-position is indicated by the vertical line labeled with reference numeral 60. The angular roll α of the vehicle 40 is defined as the angle by which the vehicle 40 deviates from this zero-position 60 about a pivot point 61 defined by the contact of the wheel of the vehicle 40 with the underlying ground surface. Assuming that only gravitational forces act on the vehicle 40, once the vehicle 40 has deviated from the zero-position 60 such that the angular roll a exceeds a predetermined warning threshold value $\alpha_1$ (as measured by the dual-axis tilt sensor integral and internal to the central controller), the microprocessor of the central controller generates a warning signal. The warning threshold value $\alpha_1$ is specific to a particular vehicle and is indicative of a potential rollover condition. Therefore, the warning signal generated by the microprocessor activates local visible and/or audible alarms 30, 32, as shown in FIG. 2.

Similarly, assuming that only gravitational forces act on the vehicle 40, once the vehicle 40 has deviated from the zero-position 60 such that the angular roll a exceeds a predetermined emergency threshold value $\alpha_2$, the microprocessor of the central controller generates an emergency signal. The emergency threshold value $\alpha_2$ is also specific to a particular vehicle and is indicative of an immediate rollover condition. Therefore, the warning signal generated by the microprocessor of the central controller activates the local radio communications transceiver 24, as best described with reference to FIG. 1, thus causing the transmission of a signal indicative of an immediate rollover condition and containing information identifying the location of the vehicle 40 to the call center 16 via the remote radio communications transceiver 14. This warning signal also activates local visible and/or audible alarms 30, 32, as shown in FIG. 2.

However, as mentioned above, the present invention recognizes the effect of accelerations generated by the movement of the vehicle 40 and the resultant forces acting upon the vehicle 40. The system of the present invention accounts for such forces in determining whether a potential or immediate rollover condition exists. More specifically, as described above with reference to FIG. 2, the central controller of the local sensing and notification subsystem 11 also includes an integral dual-axis accelerometer (g-force sensor) and a rollover calculator. The dual-axis accelerometer measures the magnitude of acceleration acting upon the center of mass COM of the vehicle in the direction of the angular roll α of the vehicle 40 and generates a corresponding signal. The rollover calculator receives this corresponding signal from the dual-axis accelerometer, along with a signal from the dual-axis tilt sensor indicative of the angular roll α of the vehicle 40. The rollover calculator then processes these signals and determines the effective angular roll $α_e$ of the vehicle 40. Specifically, the angular roll α of the vehicle 40 is amplified by a factor of the magnitude of acceleration acting upon the center of mass COM of the vehicle in the direction of the roll α of the vehicle 40, thereby yielding the effective angular roll $α_e$ of the vehicle 40. The microprocessor of the central controller then compares the effective angular roll $α_e$ to the warning threshold value $α_1$ and the emergency threshold value $α_2$ to determine whether a potential or immediate rollover condition exists.

Figure 6:
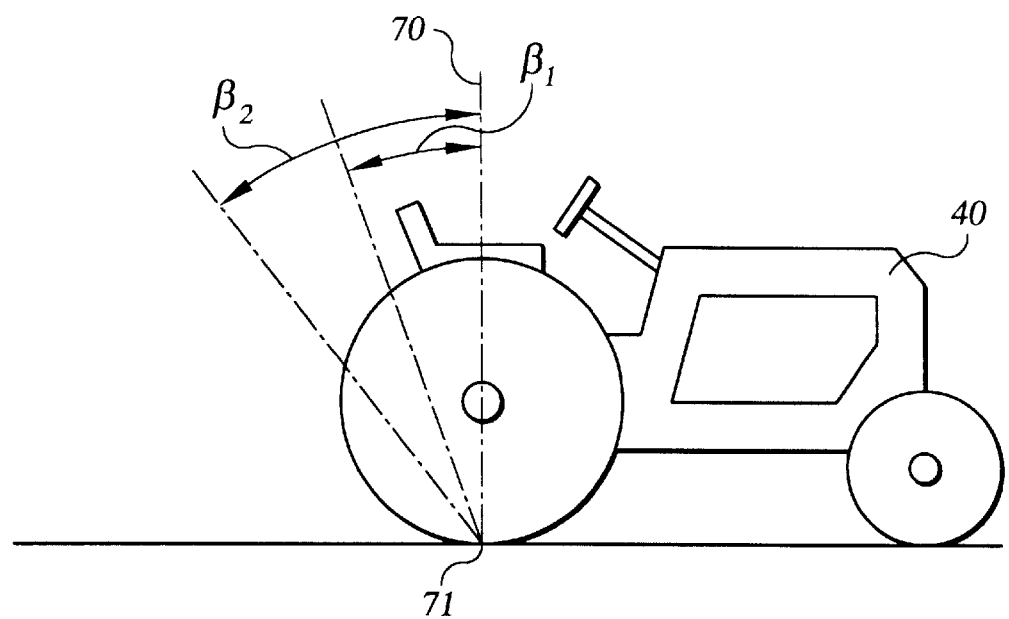
FIG. 6 is a side view of the vehicle depicted in the schematic of FIG. 4.

FIG. 6 is a side view of the tractor depicted in the schematic of FIG. 4 on level ground. This zero-position is indicated by the vertical line labeled with reference numeral 70. The angular pitch β of the vehicle 40 is defined as the angle by which the vehicle deviates from this zero-position 70 about a pivot point 71 defined by the contact of the wheel of the vehicle 40 with the underlying ground surface. Assuming that only gravitational forces act on the vehicle 40, once the vehicle 40 has deviated from the zero-position 70 such that the angular pitch β exceeds a predetermined warning threshold value $β_1$ (as measured by the dual-axis tilt sensor integral and internal to the central controller), the microprocessor of the central controller generates a warning signal. The warning threshold value $β_1$ is specific to a particular vehicle and is indicative of a potential rollover condition. Therefore, the warning signal generated by the microprocessor of the central controller activates local visible and/or audible alarms 30, 32, as shown in FIG. 2.

Similarly, assuming that only gravitational forces act on the vehicle 40, once the vehicle 40 has deviated from the zero-position 70 such that the angular pitch β exceeds a predetermined emergency threshold value $β_2$, the microprocessor of the central controller generates an emergency signal. The emergency threshold value $β_2$ is also specific to a particular vehicle and is indicative of an immediate rollover condition. Therefore, the warning signal generated by the microprocessor of the central controller activates the local radio communications transceiver 24, as best described with reference to FIG. 1, thus causing the transmission of a signal indicative of an immediate rollover condition and containing information identifying the location of the vehicle 40 to the call center 16 via the remote radio communications transceiver 14. This warning signal also activates local visible and/or audible alarms 30, 32, as shown in FIG. 2.

Again, however, the present invention accounts for such forces generated by the movement of the vehicle 40 in determining whether a potential or immediate rollover condition exists. Specifically, the dual-axis accelerometer also measures the magnitude of acceleration acting upon the center of mass COM of the vehicle in the direction of the angular pitch β of the vehicle 40 and generates a corresponding signal. The rollover calculator receives this corresponding signal from the dual-axis accelerometer, along with a signal from the dual-axis tilt sensor indicative of the angular pitch β of the vehicle 40. The rollover calculator then processes these signals and determines the effective angular pitch $β_e$ of the vehicle 40. Specifically, the angular pitch β of the vehicle 40 is amplified by a factor of the magnitude of acceleration acting upon the center of mass COM of the vehicle in the direction of the pitch β of the vehicle 40, thereby yielding the effective angular pitch $β_e$ of the vehicle 40. The microprocessor of the central controller then compares the effective angular pitch $β_e$ to the warning threshold value $β_1$ and the emergency threshold value $β_2$ to determine whether a potential or immediate rollover condition exists.

It is also important to note that rearward rollovers are a particularly troublesome and common problem for tractors, specifically when such tractors are used for pulling an immovable or exceedingly heavy load. In this regard, the present invention further contemplates that the microprocessor also generate signals that cause a shutdown of the engine, disengagement of the clutch, and/or application of brakes to the rearward axle to relieve the rear axle torque and prevent the rearward rollover.

Figures 2, 3:
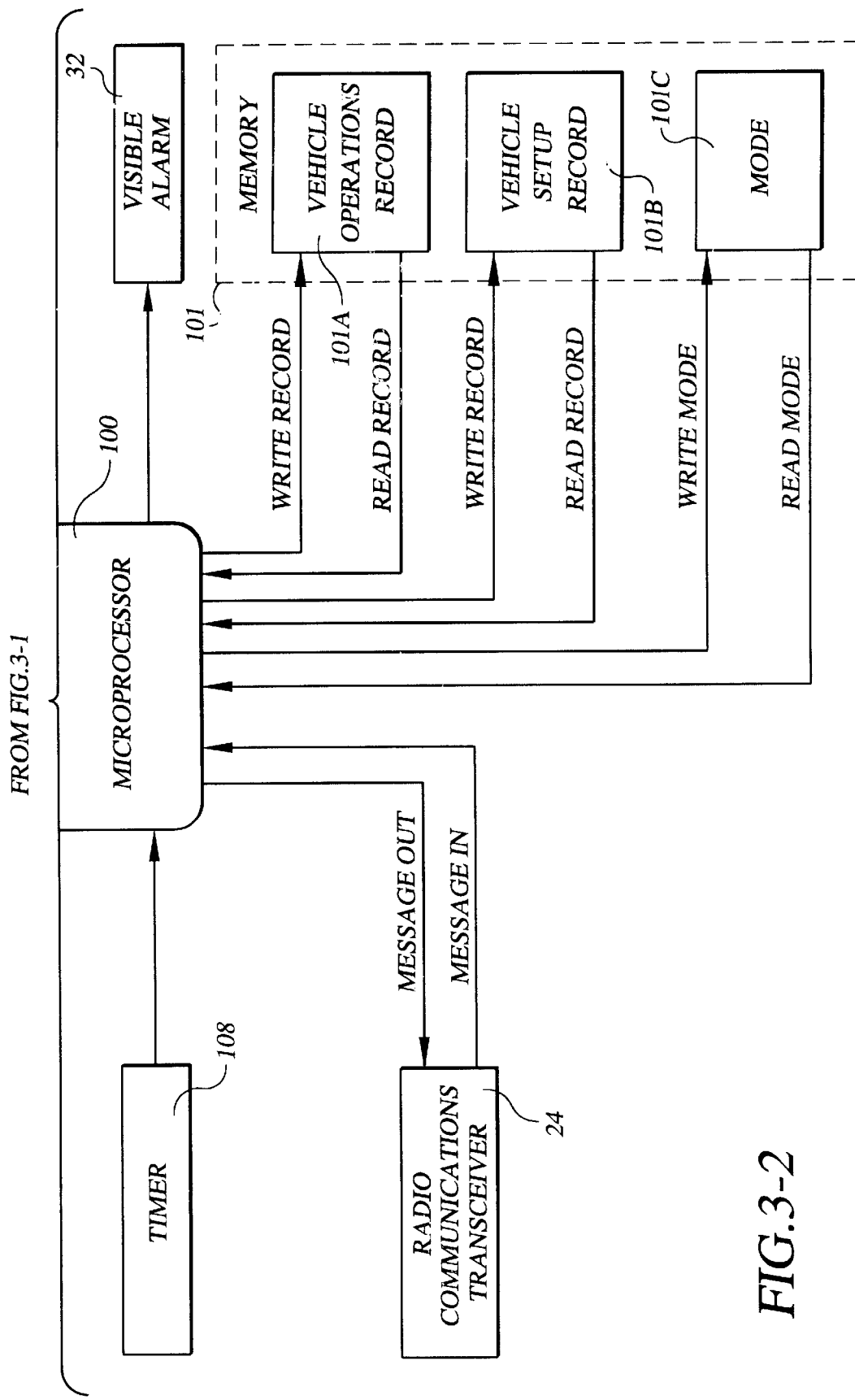
FIGS. 3.1–3.2 are flow diagrams depicting the data exchange between various components of the local sensing and notification subsystem of the vehicle rollover safety system of the present invention.

A better understanding of the individual components of the local sensing and notification subsystem and the data exchange therebetween can be achieved with reference to FIG. 3. As shown in FIG. 3, all control and operation of the system is managed by the microprocessor, as generally indicated by reference numeral 100. The microprocessor has an associated memory register 101. As discussed above, the microprocessor 100 and associated memory register 101 are part of the central processor 20 (shown in FIG. 2), which also includes a keypad 21 or similar input means, a dual-axis tilt sensor 102, a dual-axis accelerometer (g-force sensor) 104, a rollover calculator 106, and a timer 108.

The rollover calculator 106 receives signals indicative of the angular orientation (i.e., roll and pitch) of a vehicle from the dual-axis tilt sensor 102 and also receives signals indicative of the lateral and/or longitudinal acceleration of the vehicle from the dual-axis accelerometer 104. In this regard, a first micro-electromechanical system (MEMS) accelerometer could be configured as a dual-axis tilt sensor 102, and a second MEMS accelerometer could be configured as a dual-axis accelerometer 104. One such MEMS accelerometer is the ADXL202 accelerometer manufactured and distributed by Analog Devices, Inc. of Norwood Mass. Also, as mentioned above, U.S. Pat. No. 6,038,495, issued to Schiffmann and assigned to the Delco Electronics Corporation of Kokomo, Ind., describes a sensor that includes a roll angular rate sensor, a pitch angular rate sensor, and a vertical accelerometer along with an associated microprocessor for predicting rollover (i.e. rollover calculator). Such a sensor could be incorporated into the present invention without departing from the spirit and scope of the present invention.

As described above the rollover calculator 106, which is integral to the microprocessor 100, determines the effective angular roll and effective angular pitch of the vehicle and transmits signals representative of such values to the microprocessor 100. The microprocessor 100 compares these values to the respective warning threshold values and emergency threshold values to determine whether a potential or immediate rollover condition exists. While such measurement and calculation is occurring, the microprocessor 100 also continuously receives a signal representative of the position of the vehicle from the GPS receiver 22.

The keypad 21 is used to enter pertinent information, such as physical vehicle characteristics, into the memory register 101 associated with the microprocessor 100. In this regard, as depicted in FIG. 3, the memory register 101 is preferably non-volatile and programmable and includes three internal modules: a vehicle operations record module 101A, a vehicle setup record module 101B, and an operating mode module 101C.

The vehicle operations record module 101A is equivalent to the "black box" commonly found on commercial airplanes as is preferably maintains records of recent vehicle operating conditions as measured by vehicle sensors. For example, this module 101A preferably maintains record of the (1) right lateral roll angle; (2) left lateral roll angle; (3) forward pitch angle; (4) rearward pitch angle; (5) right lateral acceleration; (6) left lateral acceleration; (7) forward acceleration; (8) rearward acceleration; and (9) the location of the vehicle as determined by the GPS receiver 22. Recordation of each of these values is time-stamped using the timer 108. It is preferred that each of these values be sampled at a periodic interval of 0.05 to 0.2 seconds, and then recorded using a FIFO (First In, First Out) method so the most recent vehicle operating history is always maintained.

The vehicle setup record module 101B maintains information related to physical vehicle characteristics, including a unique vehicle identification code and the appropriate warning and emergency threshold values described above. For example, this module 101B preferably maintains record of the (1) warning threshold value for right lateral roll; (2) emergency threshold value for right lateral roll; (3) warning threshold value for left lateral roll; (4) emergency threshold value for left lateral roll; (5) warning threshold value for forward pitch; (6) emergency threshold value for forward pitch; (7) warning threshold value for rearward pitch; and (8) emergency threshold value for rearward pitch. Such information is typically entered by the vehicle manufacturer using the keypad 21 or downloaded directly into the memory module 101B.

Finally, the operating mode module 101C tracks the current operations mode of the system of the present invention, as will be further described below.

In FIG. 3, there are two additional components transmitting data to the microprocessor 100. There is an emergency alarm cancel switch 34 which, when activated by a vehicle operator or occupant, cancels the emergency alarms and/or the transmission of an emergency signal. There is also a steering angle sensor 36 which communicates to the microprocessor 100 the angular orientation of the steered wheels of the vehicle.

Examining now the components to which signals are outputted from the microprocessor 100, as discussed above, the local sensing and notification subsystem preferably includes an audible alarm 30 (e.g., a siren) and a visible alarm 32 (e.g., a strobe light) activated when a potential or immediate rollover condition exists. The audible alarm 30 is activated when the microprocessor 100 of the central controller determines that the effective angular roll or effective angular pitch exceeds the respective warning threshold or emergency threshold value. In this regard, it is preferred that the audible alarm 30 have variable controls in that the tone, volume, and pulse rate can be controlled. Thus, as the effective angular roll or effective angular pitch exceeds the respective warning threshold value and increasingly nears the emergency threshold value, the microprocessor 100 can cause an corresponding increase in the tone, volume, and pulse rate of the audible alarm 30 to warn the operator of the increasing potential for a rollover. When a rollover has occurred, the tone and volume of the audible alarm 30 encourages the vehicle operator to cancel the alarm 30 using the emergency cancel switch 34, and, if the vehicle operator is unable to do so, the alarm 30 may also aid rescuers in locating the accident site.

As for the visible alarm 32, it is similarly activated by a signal from the microprocessor 100 to warn the vehicle operator of a potential rollover condition, and, when a rollover has occurred, it may also aid rescuers in locating the accident site.

Finally, in this preferred embodiment, the local sensing and notification subsystem includes a display panel 35 that receives signals representative of vehicle operating conditions from the microprocessor 100 and provides information related to such operating conditions to the operator or vehicle occupants.

In conjunction with the display panel 35, as mentioned above, the local sensing and notification subsystem further includes a steering angle sensor 36 which communicates to the microprocessor 100 the angular orientation of the steered wheels of the vehicle. With this information, the microprocessor can generate a signal that causes the display panel 35 to communicate to the operator a recommended steering correction should a potential rollover condition exist. For example, it is contemplated that the display panel 35 include left and right indicators (e.g., arrows) that pulse to indicate the direction in which the operator should turn the vehicle. As an alternative, the internal vehicle turn signal indicators could be used to communicate the recommended steering correction.

Figures 1, 7:
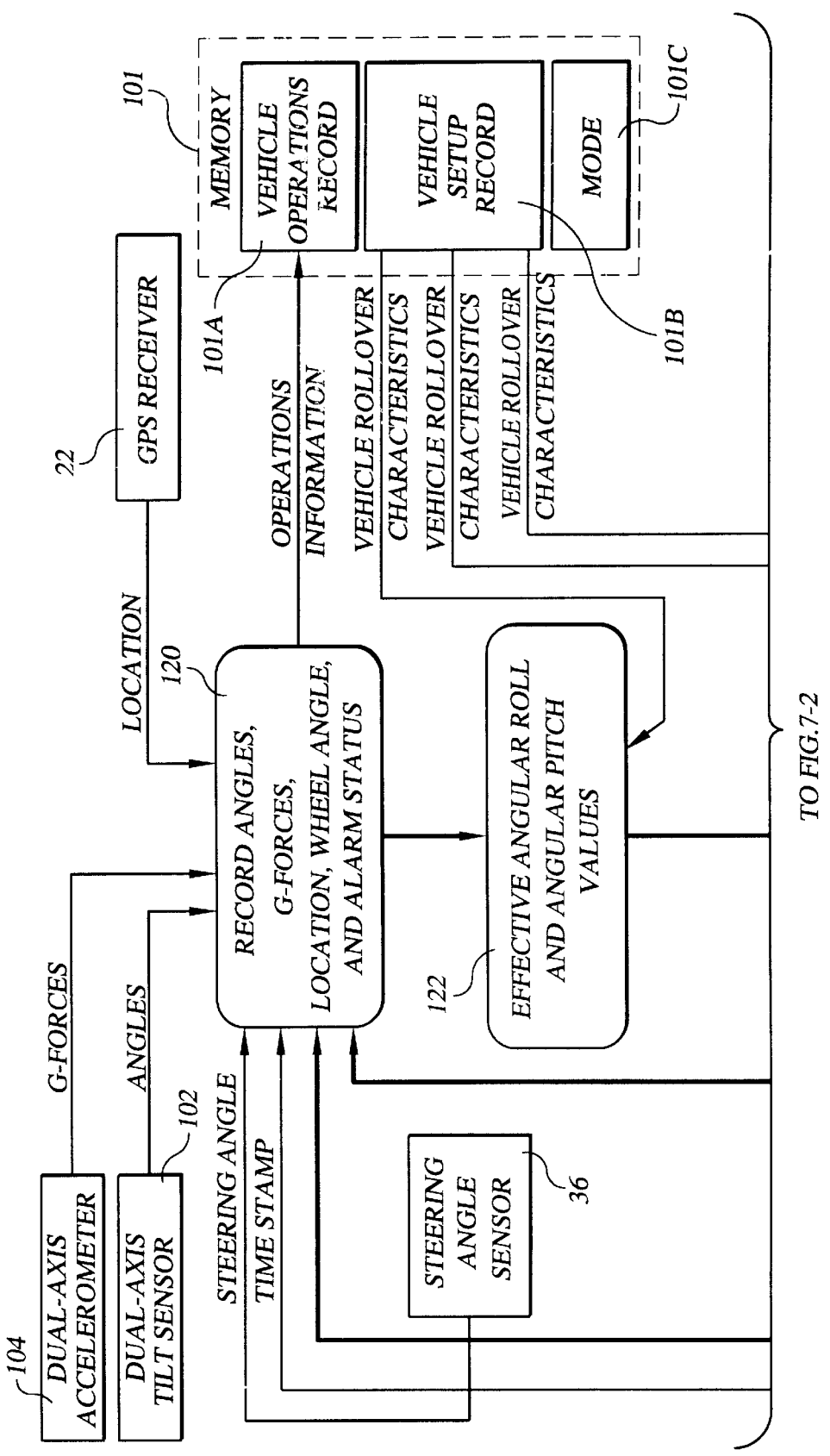
FIGS. 7.1–7.3 are flow diagrams depicting the function of the vehicle rollover safety system of the present invention in the normal mode.
Figure 8:
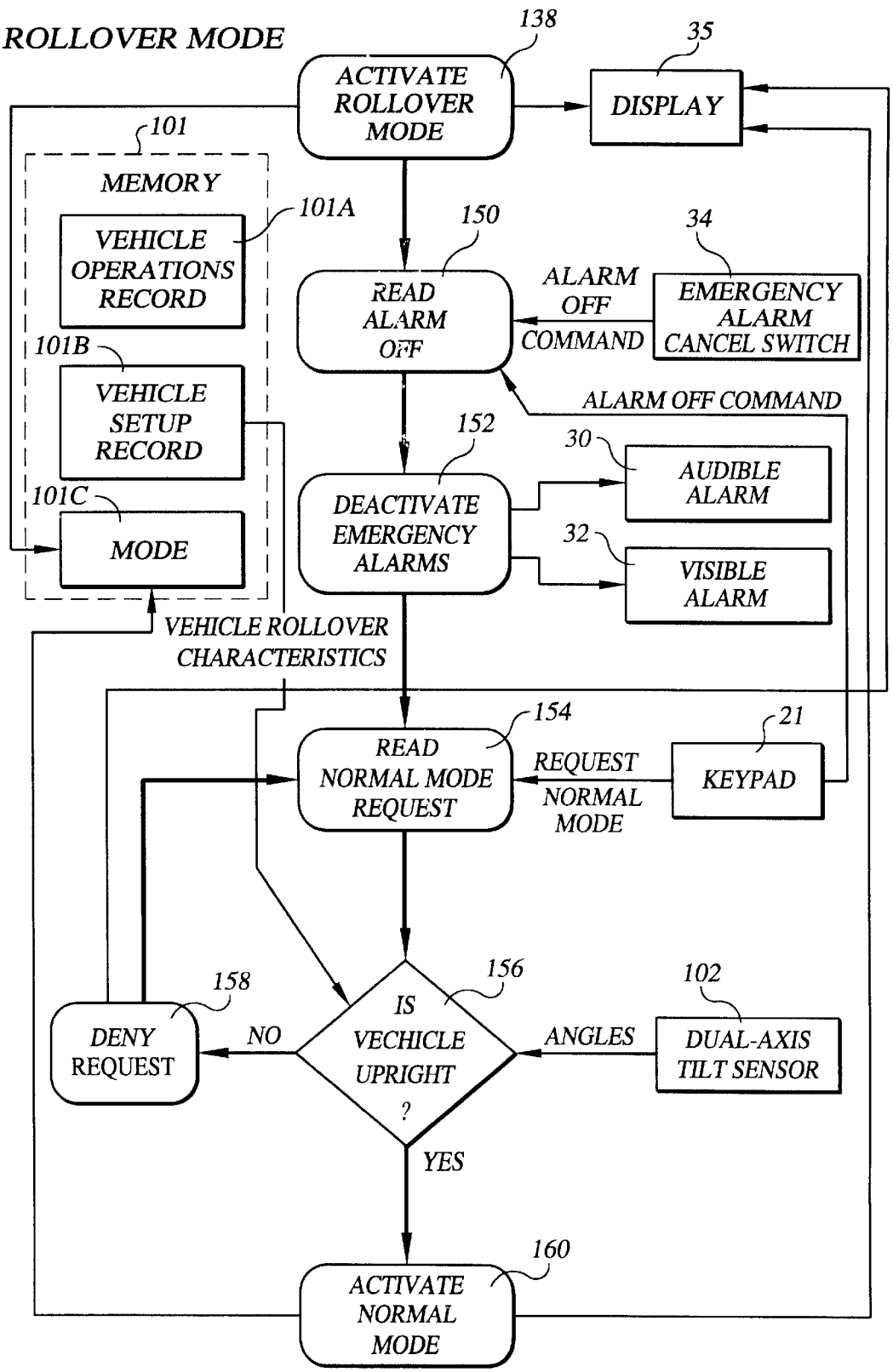
FIG. 8 is a flow diagram depicting the function of the vehicle rollover safety system of the present invention in the rollover mode.
Figure 9:
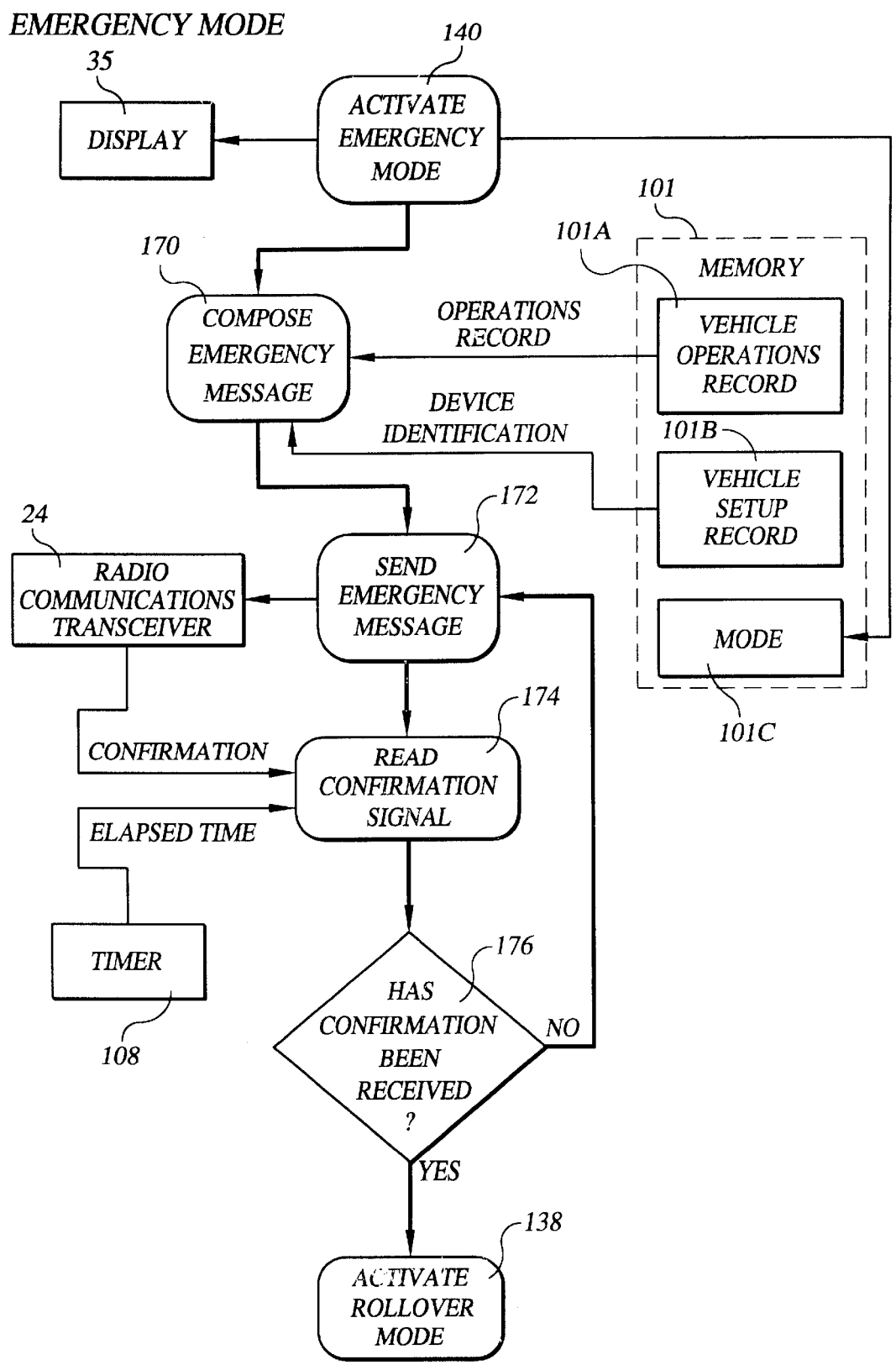
FIG. 9 is a flow diagram depicting the function of the vehicle rollover safety system of the present invention in the emergency mode.

FIGS. 7–9 describe, through a series of logic flow diagrams, the operation of the microprocessor. FIG. 7 is a flow diagram depicting the function of the vehicle rollover safety system of the present invention in the normal mode. As shown, signals from the dual-axis tilt sensor 102, dual-axis accelerometer 104, the GPS receiver 22, the timer 108, and the steering angle sensor 36 are transmitted to the microprocessor at regular intervals, and the microprocessor records these values, as indicated by operation box 120, in the vehicle operations record module 101A of the memory register 100. The logic flow then proceeds to operation box 122 where the effective angular roll and effective angular pitch values are calculated by the rollover calculator. After the effective angular roll and pitch values are calculated, a comparison of these values to the established warning threshold values is made to determine if either the effective angular roll or the effective angular pitch exceeds the respective warning threshold value, as indicated by decision 124. If not, the logic flow returns to operation box 120, and the process starts again.

If either the effective angular roll or the effective angular pitch exceeds the respective warning threshold value, the logic flow proceeds to decision 126 where a determination is made as to whether the effective angular roll or the effective angular pitch exceeds the respective emergency threshold value. If not, the logic flow proceeds to operation box 128, and the warning alarm (which may be the audible alarm 30 and/or visible 32 alarm, as described above) is activated, and a signal is transmitted to the display panel 35 causing the panel 35 to display a corresponding warning message. At the same time, the occurrence of this alarm (i.e., the alarm status) is recorded, as indicated by operation box 120. Finally, although not shown in this particular flow diagram, it is preferred that the steering sensor 36 cooperate with the microprocessor and display panel 35 to provide the vehicle operator with an immediate suggested steering correction to counter the forces that cause the potential rollover condition.

Returning to decision 126, if either the effective angular roll or the effective angular pitch does exceed the respective emergency threshold value, the logic flow proceeds to operation box 130, and the emergency alarms are activated. At the same time, the logic flow proceeds to operation box 132, and a signal is sent to the display panel 25 causing a cancellation request to be displayed on the panel 35. As indicated by operation box 134, the system waits a predetermined time period, as measured by the timer 108. Proceeding to decision 136, if a cancellation signal is received from the emergency cancel switch 34 within the predetermined time period, the rollover mode is activated at operation box 138, as will be described with reference to FIG. 8. If no cancellation signal is received within the predetermined time period, the emergency mode is activated at operation box 140, as will be described with reference to FIG. 9.

FIG. 8 is a flow diagram depicting the function of the vehicle rollover safety system of the present invention in the rollover mode. As the rollover mode subroutine commences, a signal is transmitted to the display panel 35 causing the panel 35 to display a message or an indicator that the system is in the rollover mode. At the same time, a record of the commencement of the rollover mode is stored in the operating mode module 101C of the memory register 101. The logic flow proceeds to operation box 150 where the system waits for a signal from either the emergency cancel switch 34 or the keypad 21 indicative of an operator request to cancel the rollover alarm. Once such a signal is received, the logic flow continues to operation box 152 where signals are sent to both the audible alarm 30 and visible alarm 32 deactivating said alarms 30, 32. The logic flow then proceeds to operation box 154, where the system waits for a signal generated by a keypad 21 entry requesting a return to the normal mode. This requires a decision, as indicated by reference numeral 156, as to whether the vehicle has been returned to an upright position. The microprocessor receives data from the dual-axis tilt sensor 102 and compares this information with data stored in the vehicle setup record 101B to make a determination as to whether the vehicle has indeed been returned to an upright position. If not, this logic flow proceeds to operation box 158, and a signal is transmitted to the display panel 35 causing the panel 35 to display a message or an indicator that the request for a return to normal mode has been denied. At the same time, the logic flow returns to operation box 154, where the system waits for a signal generated by a keypad 21 entry requesting a return to the normal mode.

If a determination is made at decision 156 that the vehicle has been returned to an upright position, the logic flow proceeds to operation box 160, a return to normal mode, and a signal is transmitted to the display panel 35 causing the panel 35 to display a message or an indicator that the system is in the normal mode.

FIG. 9 is a flow diagram depicting the function of the vehicle rollover safety system of the present invention in the emergency mode. As the emergency mode subroutine commences, a signal is transmitted to the display panel 35 causing the panel 35 to display a message or an indicator that the system is in the emergency mode. At the same time, a record of the commencement of the emergency mode is stored in the operating mode module 101C of the memory register 101. The logic flow proceeds to operation box 170 where an emergency message is composed which includes the vehicle operations record as stored in the vehicle operations record module 101A (which, at a minimum, includes the location of the vehicle as determined by the GPS receiver) and the unique vehicle identification code stored in the vehicle setup record 101B. The logic flow then proceeds to operation box 172, and the emergency message is transmitted via the local radio communications transceiver 24. As discussed with reference to FIGS. 1 and 2, the local radio communications transceiver 24 transmits this emergency message to a remote radio communications transceiver 14 (e.g., satellite), which in turn relays the emergency message to a call center 16 which dispatches necessary emergency assistance. Returning to FIG. 9, the logic flow proceeds to operation box 174, where the system waits a predetermined time period, as measured by the timer 108, for a confirmation signal from the call center via the remote radio communications transceiver. Proceeding to decision 176, if a confirmation signal (indicating assistance has been dispatched) is received within the predetermined time period, the rollover mode is activated at operation box 138, as previously described with reference to FIG. 8. If no cancellation signal is received within the predetermined time period, the logic flow returns to operation box 172 and the emergency message is again transmitted via the local radio communications transceiver 24.

Figure 10:
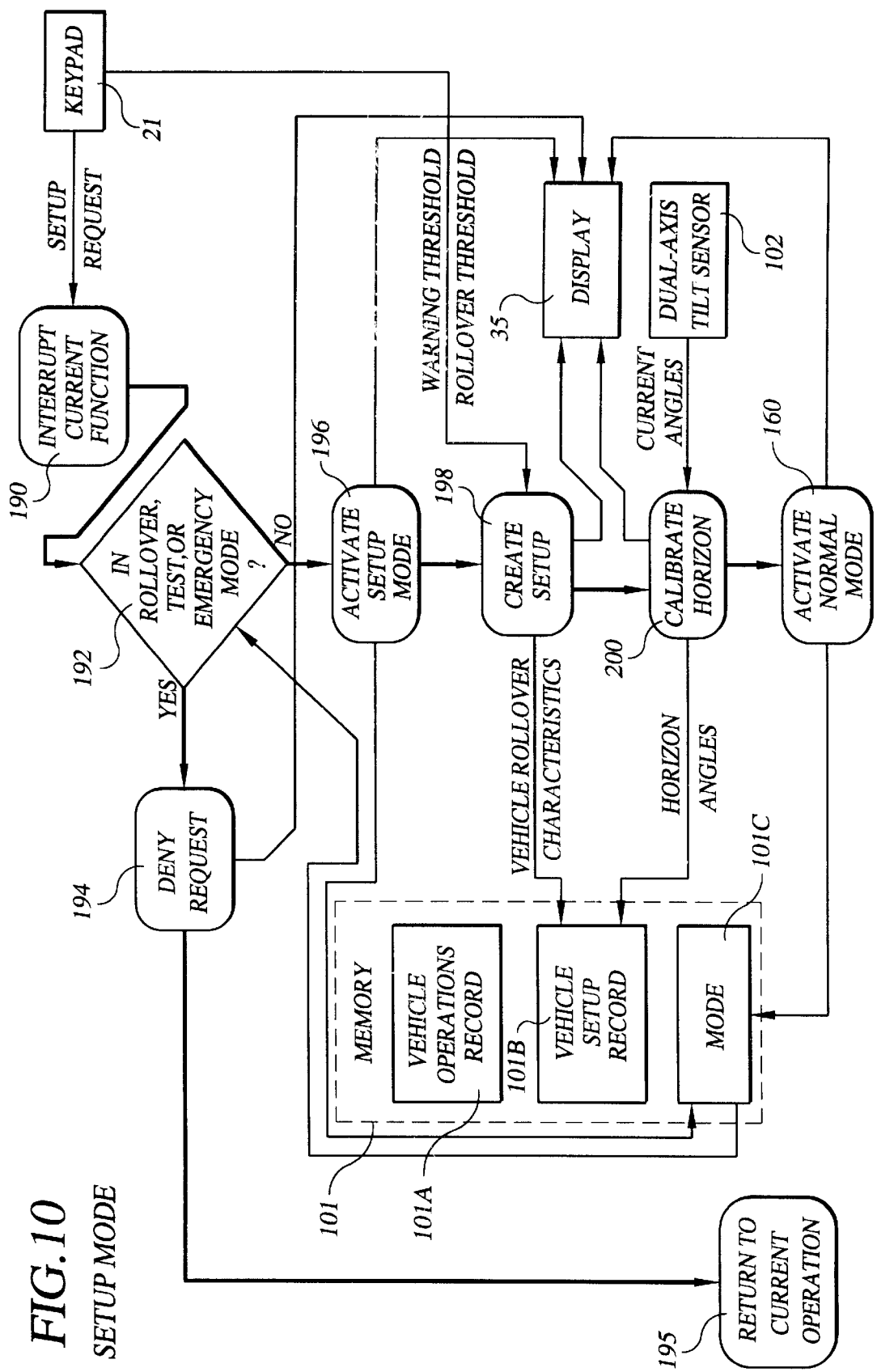
FIG. 10 is a flow diagram depicting the function of the vehicle rollover safety system of the present invention in the setup mode.

FIG. 10 is a flow diagram depicting the function of the vehicle rollover safety system of the present invention in the setup mode. The setup mode can only be activated by interrupting another operational mode (i.e., normal, rollover, and emergency modes), as indicated by operation box 190. As indicated in FIG. 10, such interruption is initiated by a keypad 21 request. The logic flow then proceeds to decision 192 where a determination is made as to whether the system is in the rollover, emergency, or test modes. In this regard, information concerning the mode of the system is stored in the operating mode module 101C of the memory register. If so, the interruption request is denied as indicated by operation box 194, and a signal is transmitted to the display panel 35 causing the panel 35 to display a message or an indicator that the request has been denied. The system remains in the current operational mode, as indicated by operation box 195.

If a determination is made that the system is not in the rollover, emergency, or test modes (i.e., the system is in the normal mode), the logic flow proceeds to operation box 196 where the setup mode is activated. A signal is transmitted to the display panel 35 causing the panel 35 to display a message or an indicator that the system is in the setup mode. At the same time, a record of the commencement of the setup mode is stored in the operating mode module 101C of the memory register 101. The logic flow then proceeds to operation box 198 where the physical vehicle characteristics, including the appropriate warning and emergency threshold values are entered using the keypad 21 as prompted by messages on the display panel 35; the vehicle characteristics are stored in the vehicle setup record module 101B of the memory register 101. After the physical vehicle characteristics have been stored, the logic flow continues to operation box 200 where the horizon is calibrated. This operation must be performed when the vehicle is on a level, horizontal surface. A signal is received from the dual-axis tilt sensor 102 indicative of its present orientation; it is assumed that this signal is representative of the horizon, and all future measurements will be based on this zero-position. This calibration information is also stored in the vehicle setup record module 101B of the memory register 101. After calibration of the horizon, the system returns to normal mode, as indicated by operation box 160.

Figure 11:
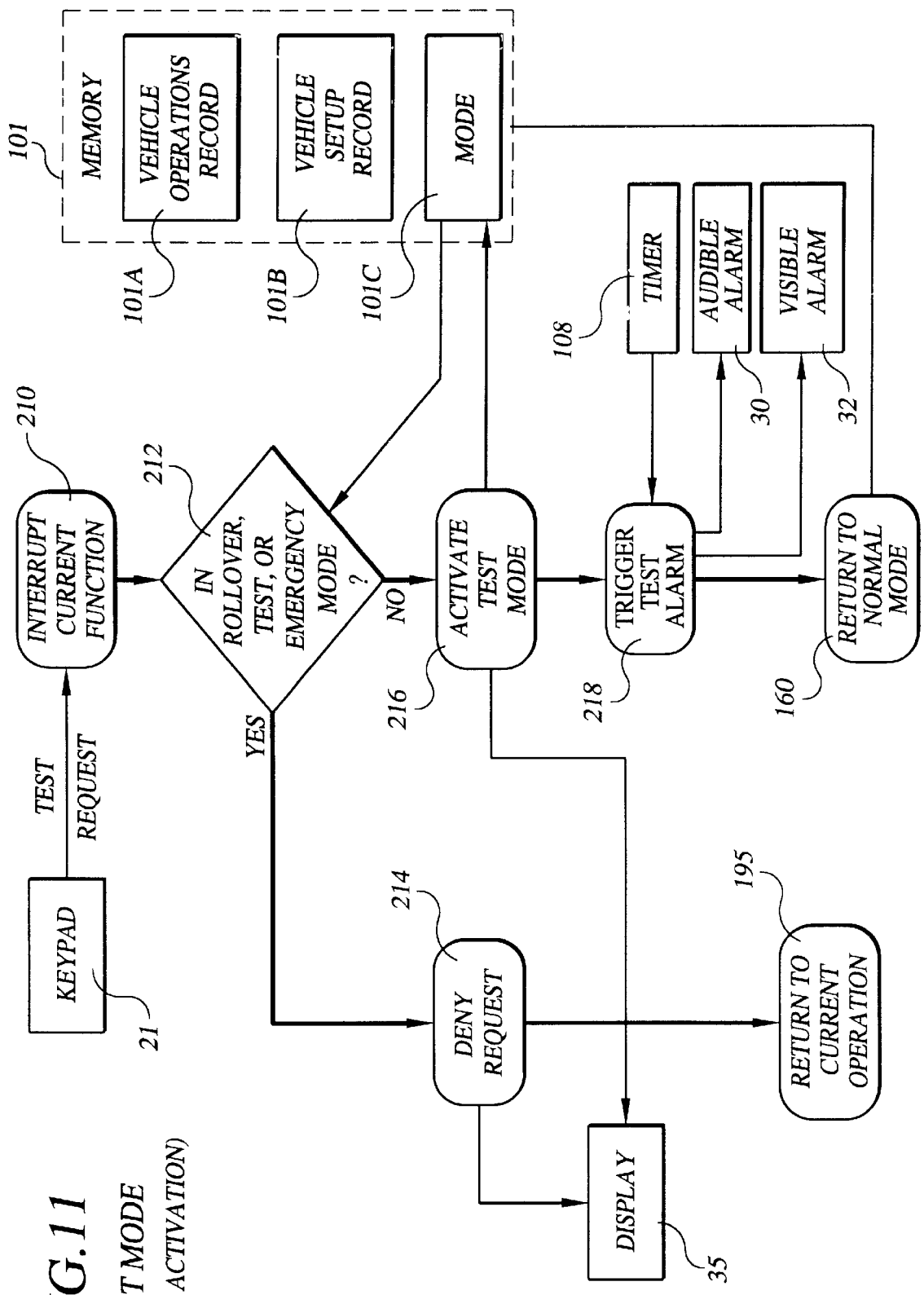
FIG. 11 is a flow diagram depicting the function of the vehicle rollover safety system of the present invention in the test mode initiated by a local activation.

The system also has two test modes, a first test mode that is activated locally, and a second test mode that is activated remotely (e.g., from the call center 16, as shown in FIG. 1). FIG. 11 is a flow diagram depicting the function of the vehicle rollover safety system of the present invention in the test mode initiated by a local activation. As with the setup mode, the local test mode can only be activated by interrupting another operational mode (i.e., normal, rollover, and emergency modes), as indicated by operation box 210. The interruption is initiated by a keypad 21 request. The logic flow then proceeds to decision 212 where a determination is made as to whether the system is in the rollover, emergency, or test modes. If so, the interruption request is denied as indicated by operation box 214, and a signal is transmitted to the display panel 35 causing the panel 35 to display a message or an indicator that the request has been denied. The system remains in the current operational mode, as indicated by operation box 195.

If a determination is made that the system is not in the rollover, emergency, or test modes (i.e., the system is in the normal mode), the logic flow proceeds to operation box 216 where the test mode is activated. A signal is transmitted to the display panel 35 causing the panel 35 to display a message or an indicator that the system is in the test mode. At the same time, a record of the commencement of the test mode is stored in the operating mode module 101C of the memory register 101. The logic flow then proceeds to operation box 218 where a test alarm is triggered, thus activating the audible alarm 30 and the visible alarm 32 for a predetermined time period as measured by the timer 108. After the predetermined time period has elapsed, the system returns to normal mode, as indicated by operation box 160.

FIG. 12 is a flow diagram depicting the function of the vehicle rollover safety system of the present invention in the test mode initiated by a remote activation. An interruption is initiated by the call center 16 via the remote radio communications transceiver 24 and the local radio communications transceiver 14, which are shown in FIGS. 1 and 2. This interruption request is received by the system as indicated by operation box 230. As with the local test mode, the logic flow then proceeds to decision 232 where a determination is made as to whether the system is in the rollover, emergency, or test modes. If so, the interruption request is denied as indicated by operation box 234, and a denial signal is transmitted to the call center via the local radio communications transceiver 24. The system remains in the current operational mode, as indicated by operation box 195.

If a determination is made that the system is not in the rollover, emergency, or test modes (i.e., the system is in the normal mode), the logic flow proceeds to operation box 236 where the test mode is activated. A record of the commencement of the test mode is stored in the operating mode module 101C of the memory register 101. The logic flow continues to operation box 238 where an emergency test message is composed which includes the vehicle operations record as stored in the vehicle operations record module 101A (which at a minimum includes the position of the vehicle as determined by the GPS receiver) and the vehicle identification information stored in the vehicle setup record 101B. The emergency test message is then transmitted via the local radio communications transceiver 24, as indicated in operation box 240. As discussed with reference to FIGS. 1 and 2, the local radio communications transceiver 24 transmits this emergency test message to a remote radio communications transceiver 14 (e.g., satellite), which in turn relays the emergency message to a call center 16 which verifies that the system is fully functional.

It will be obvious to those skilled in the art that modifications may be made to the preferred embodiments described herein without departing from the spirit and scope of the present invention.

What is claimed is:

1. A sensing and notification system for detecting and warning of a potential rollover condition for a vehicle having one or more predefined critical threshold values, said system comprising:

a rollover sensing subsystem including:
  (a) central processor for receiving signals indicative of present vehicle operating characteristics; and
  (b) at least two sensors for monitoring vehicle operating characteristics, a first sensor being secured relative to said vehicle for measuring the lateral and longitudinal angular orientation of said vehicle relative to a fixed horizon, said first sensor transmitting a signal to said central processor indicative of the lateral and longitudinal angular orientation of said vehicle, and a second sensor measuring the lateral and longitudinal acceleration of said vehicle, said second sensor transmitting a signal to said central processor indicative of the lateral and longitudinal acceleration of said vehicle;

said central processor receiving signals indicative of present vehicle operating characteristics from said sensors, processing said signals to generate first and second present condition values, comparing said first and second present condition values to said predefined critical threshold values, and generating an alarm signal when said first or second present condition values exceeds one or more of the predefined critical threshold values; and an alarm and warning subsystem for notifying an operator of said vehicle upon receipt of said alarm signal from said central processors;

wherein said rollover sensing subsystem further includes a steering angle sensor for measuring the steering angle of said vehicle relative to a predetermined zero angle and a visual display panel, said steering angle sensor transmitting a signal to said central processor indicative of the steering angle of said vehicle, and, when said first or second present condition values exceeds one or more of the predefined critical threshold values, said central processor determining an appropriate steering angle correction and communicating such appropriate steering angle correction to said operator through said visual display panel.

2. A sensing and notification system as recited in claim 1, wherein said predefined critical threshold values include:

a left lateral warning threshold value, said central processor generating said alarm signal when the first present condition value exceeds the left lateral warning threshold value, thereby causing said alarm and warning subsystem to notify the operator of said vehicle by generating a corresponding warning alarm; and a right lateral warning threshold value, said central processor generating said alarm signal when the first present condition value exceeds the right lateral warning threshold value, thereby causing said alarm and warning subsystem to notify the operator of said vehicle by generating said corresponding warning alarm.

3. A sensing and notification system as recited in claim 2, wherein said predefined critical threshold values further include:

a forward longitudinal warning threshold value, said central processor generating said alarm signal when the second present condition value exceeds the forward longitudinal warning threshold value, thereby causing said alarm and warning subsystem to notify the operator of said vehicle by generating said corresponding warning alarm; and a rearward longitudinal warning threshold value, said central processor generating said alarm signal when the second present condition value exceeds the rearward longitudinal warning threshold value, thereby causing said alarm and warning subsystem to notify the operator of said vehicle by generating said corresponding warning alarm.

4. A sensing and notification system as recited in claim 1, wherein said predefined critical threshold values include:
- a left lateral emergency threshold value, said central processor generating said alarm signal when the first present condition value exceeds the left lateral emergency threshold value, thereby causing said alarm and warning subsystem to notify the operator of said vehicle by generating a corresponding emergency alarm; and
- a right lateral emergency threshold value, said central processor generating said alarm signal when the first present condition value exceeds the right lateral emergency threshold value, thereby causing said alarm and warning subsystem to notify the operator of said vehicle by generating said corresponding emergency alarm.

5. A sensing and notification system as recited in claim 4, said system further comprising:
- a satellite signal receiver and processor secured to said vehicle for receiving remote signals from associated satellite transmitters and processing said remote signals to determine the present location of said vehicle; and
- a radio transmitter secured to said vehicle activated by said alarm signal for communicating said present location of said vehicle to a remote call center, thereby notifying said remote call center of the emergency alarm condition and the present location of said vehicle.

6. A sensing and notification system as recited in claim 4, wherein said predefined critical threshold values further include:
- a forward longitudinal emergency threshold value, said central processor generating said alarm signal when the second present condition value exceeds the forward longitudinal emergency threshold value, thereby causing said alarm and warning subsystem to notify the operator of said vehicle by generating said corresponding emergency alarm; and
- a rearward longitudinal warning threshold value, said central processor generating said alarm signal when the second present condition value exceeds the rearward longitudinal emergency threshold value, thereby causing said alarm and warning subsystem to notify the operator of said vehicle by generating said corresponding emergency alarm.

7. A sensing and notification system as recited in claim 6, said system further comprising:
- a satellite signal receiver and processor secured to said vehicle for receiving remote signals from associated satellite transmitters and processing said remote signals to determine the present location of said vehicle; and
- a radio transmitter secured to said vehicle activated by said alarm signal for communicating said present location of said vehicle to a remote call center, thereby notifying said remote call center of the emergency alarm condition and the present location of said vehicle.

8. A sensing and notification system as recited in claim 1, wherein said alarm and warning subsystem comprises an audible alarm for notifying the operator of said vehicle upon receipt of said alarm signal from said central processor.

9. A sensing and notification system as recited in claim 8, wherein said alarm and warning subsystem further comprises a visible alarm for notifying the operator of said vehicle upon receipt of said alarm signal from said central processor.

10. A sensing and notification system as recited in claim 1, wherein said alarm and warning subsystem comprises a visible alarm for notifying the operator of said vehicle upon receipt of said alarm signal from said central processor.

11. A system for detecting a potential or immediate rollover condition of a vehicle and alerting an operator of said vehicle of said condition, comprising:
- a first sensor mounted to said vehicle for sensing a magnitude of acceleration of said vehicle in at least one direction and generating a first signal proportional to said magnitude of acceleration;
- a second sensor mounted to said vehicle for sensing a magnitude of angular roll of said vehicle in said one direction and generating a second signal proportional to said magnitude of angular roll;
- a controller for computing a present condition value from said first and second signals, comparing said present condition value to a predetermined emergency threshold level, and at which level the vehicle will roll over; and
- a steering angle sensor for measuring the steering angle of said vehicle relative to a predetermined zero angle and a visual display panel, said steering angle sensor transmitting a signal to said controller indicative of the steering angle of said vehicle;
- wherein said controller generates a warning signal when said present condition value approaches said emergency threshold level and, upon generation of said warning signal by the controller, said controller determining an appropriate steering angle correction and communicating such appropriate steering angle correction to said operator through said visual display panel, and
- wherein said controller generates an emergency signal when said present condition value exceeds said emergency threshold level.

12. A system as recited in claim 11, wherein said emergency threshold level is a function of a magnitude of acceleration in one direction and a magnitude of angular roll in said one direction.

13. A system as recited on claim 11, and further comprising an audible alarm activated by said warning signal from said controller, thereby notifying the operator of said vehicle of the potential rollover condition.

14. A system as recited in claim 13, and further comprising a visible alarm activated by said warning signal from said controller, thereby notifying the operator of said vehicle of the potential rollover condition.

15. A system as recited on claim 11, and further comprising an audible alarm activated by said emergency signal from said controller, thereby notifying the operator of said vehicle of the immediate rollover condition.

16. A system as recited in claim 15, and further comprising a visible alarm activated by said emergency signal from said controller, thereby notifying the operator of said vehicle of the immediate rollover condition.

17. A system as recited in claim 11, and further comprising:
- a satellite signal receiver and processor secured to said vehicle for receiving remote signals from associated satellite transmitters and processing said remote signals to determine the present location of said vehicle; and
- a radio transmitter secured to said vehicle activated by said emergency signal for communicating said present location of said vehicle to a remote call center, thereby notifying said remote call center of the immediate rollover condition and the present location of said vehicle.

* * * * *